US011780502B2

(12) United States Patent
Fujii

(10) Patent No.: US 11,780,502 B2
(45) Date of Patent: Oct. 10, 2023

(54) LANE CHANGE ASSIST APPARATUS FOR VEHICLE

(71) Applicant: TOYOTA JIDOSHA KABUSHIKI KAISHA, Toyota (JP)

(72) Inventor: Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 17/563,849

(22) Filed: Dec. 28, 2021

(65) Prior Publication Data

US 2022/0119039 A1    Apr. 21, 2022

Related U.S. Application Data

(60) Division of application No. 16/890,455, filed on Jun. 2, 2020, which is a continuation of application No. (Continued)

(30) Foreign Application Priority Data

Apr. 12, 2017 (JP) .................................. 2017-078664
May 26, 2017 (JP) .................................. 2017-104434

(51) Int. Cl.
*B62D 15/02* (2006.01)
*B62D 6/00* (2006.01)
(Continued)

(52) U.S. Cl.
CPC ......... *B62D 15/0255* (2013.01); *B62D 6/003* (2013.01); *B62D 6/04* (2013.01);
(Continued)

(58) Field of Classification Search
CPC ...... B62D 15/0255; B62D 6/003; B62D 6/04; G05D 1/0212; G05D 1/0246;
(Continued)

(56) References Cited

U.S. PATENT DOCUMENTS 5,913,375 A    6/1999 Nishikawa
6,256,561 B1    7/2001 Asanuma
(Continued)

FOREIGN PATENT DOCUMENTS

JP    9-221052 A    8/1997
JP    10-169763 A    6/1998
(Continued)

OTHER PUBLICATIONS

Office Action dated Dec. 1, 2022 in U.S. Appl. No. 17/462,847.
(Continued)

*Primary Examiner* — Tyler D Paige
(74) *Attorney, Agent, or Firm* — Sughrue Mion, PLLC

(57) ABSTRACT

A driving support ECU initializes a target trajectory calculation parameter at a start of LCA; calculates, based on the target trajectory calculation parameter, a target trajectory function representing a target lateral position which is a target position of an own vehicle in a lane width direction in accordance with an elapsed time from the start of LCA; calculates a target control amount based on the target trajectory function; when a steering operation by a driver has been detected, again initializes the target trajectory calculation parameter; and recalculates the target trajectory function based on the target trajectory calculation parameter.

15 Claims, 9 Drawing Sheets

Related U.S. Application Data

15/950,404, filed on Apr. 11, 2018, now Pat. No. 10,814,913.

(51) Int. Cl.
  *G05D 1/02* (2020.01)
  *B62D 6/04* (2006.01)

(52) U.S. Cl.
  CPC ......... *G05D 1/0212* (2013.01); *G05D 1/0246* (2013.01); *G05D 1/0257* (2013.01); *B60Y 2200/11* (2013.01); *B60Y 2400/3015* (2013.01); *B60Y 2400/3017* (2013.01); *B60Y 2400/83* (2013.01); *B60Y 2400/90* (2013.01); *B60Y 2400/92* (2013.01); *G05D 2201/0213* (2013.01)

(58) Field of Classification Search
  CPC ......... G05D 1/0257; G05D 2201/0213; B60Y 2200/11; B60Y 2400/3015; B60Y 2400/3017; B60Y 2400/83; B60Y 2400/90; B60Y 2400/92
  USPC ........................................................ 701/42
  See application file for complete search history.

(56) References Cited

U.S. PATENT DOCUMENTS

| | | | |
|---|---|---|---|
| 6,879,896 B2 | 4/2005 | Martens | |
| 7,391,304 B2 | 6/2008 | Kataoka et al. | |
| 7,555,367 B2 | 6/2009 | Kuge | |
| 7,692,534 B2 | 4/2010 | Kataoka et al. | |
| 7,778,742 B2 | 8/2010 | Kuge et al. | |
| 7,893,819 B2* | 2/2011 | Pfeiffer | B62D 15/029 |
| | | | 340/435 |
| 8,301,343 B2* | 10/2012 | Tanimoto | B60W 30/12 |
| | | | 180/271 |
| 9,229,453 B1 | 1/2016 | Lee | |
| 9,499,197 B2 | 11/2016 | Tan et al. | |
| 9,779,628 B2 | 10/2017 | Yamashiro | |
| 9,884,645 B2 | 2/2018 | Fujii et al. | |
| 10,011,281 B1 | 7/2018 | Kang et al. | |
| 10,074,279 B1 | 9/2018 | Xu et al. | |
| 10,114,371 B2 | 10/2018 | Asakura et al. | |
| 10,600,324 B2* | 3/2020 | Fujii | B60W 50/14 |
| 10,647,354 B2 | 5/2020 | Fujii | |
| 10,668,920 B2* | 6/2020 | Fujii | B60W 30/0953 |
| 10,676,084 B2* | 6/2020 | Fujii | B60W 30/0956 |
| 10,676,093 B2 | 6/2020 | Nishiguchi | |
| 10,703,362 B2 | 7/2020 | Maura | |
| 10,814,913 B2 | 10/2020 | Fujii | |
| 10,953,882 B2* | 3/2021 | Fujii | B62D 15/0255 |
| 11,142,246 B2 | 10/2021 | Fujii | |
| 11,358,594 B2* | 6/2022 | Fujii | B60W 30/18163 |
| 11,427,194 B2* | 8/2022 | Fujii | B60W 30/0953 |
| 2003/0195684 A1 | 10/2003 | Martens | |
| 2004/0090117 A1 | 5/2004 | Dudeck et al. | |
| 2004/0158377 A1 | 8/2004 | Matsumoto et al. | |
| 2005/0125125 A1 | 6/2005 | Matsumoto et al. | |
| 2005/0240328 A1 | 10/2005 | Shirato et al. | |
| 2005/0270145 A1 | 12/2005 | Kataoka et al. | |
| 2006/0025918 A1 | 2/2006 | Saeki | |
| 2007/0233386 A1 | 10/2007 | Saito et al. | |
| 2008/0086241 A1 | 4/2008 | Phillips et al. | |
| 2008/0097699 A1 | 4/2008 | Ono | |
| 2008/0319612 A1 | 12/2008 | Kudo | |
| 2009/0187313 A1 | 7/2009 | Kawakami et al. | |
| 2010/0023218 A1 | 1/2010 | Hayakawa et al. | |
| 2010/0030426 A1 | 2/2010 | Okita | |
| 2010/0042282 A1 | 2/2010 | Taguchi et al. | |
| 2010/0049375 A1* | 2/2010 | Tanimoto | B60W 30/12 |
| | | | 701/1 |
| 2010/0082195 A1 | 4/2010 | Lee et al. | |
| 2010/0318263 A1 | 12/2010 | Hayakawa et al. | |
| 2010/0324823 A1 | 12/2010 | Kobayashi et al. | |
| 2012/0166071 A1 | 6/2012 | Shirahatti et al. | |
| 2012/0191343 A1 | 7/2012 | Haleem | |
| 2013/0054106 A1 | 2/2013 | Schmüdderich et al. | |
| 2013/0226432 A1 | 8/2013 | Tsuruta et al. | |
| 2013/0293395 A1 | 11/2013 | Ohama et al. | |
| 2014/0236414 A1 | 8/2014 | Droz et al. | |
| 2015/0100228 A1 | 4/2015 | Sudou et al. | |
| 2015/0142207 A1 | 5/2015 | Flehmig et al. | |
| 2015/0197249 A1 | 7/2015 | Sakima et al. | |
| 2015/0251656 A1 | 9/2015 | Yester et al. | |
| 2015/0266477 A1 | 9/2015 | Schmüdderich | |
| 2016/0001776 A1 | 1/2016 | Kim | |
| 2016/0107687 A1 | 4/2016 | Yamoka | |
| 2016/0185388 A1 | 6/2016 | Sim | |
| 2016/0225261 A1 | 8/2016 | Matsumoto | |
| 2016/0297447 A1 | 10/2016 | Suzuki | |
| 2016/0304126 A1 | 10/2016 | Yamaoka et al. | |
| 2016/0311464 A1 | 10/2016 | Yamaoka | |
| 2016/0313738 A1 | 10/2016 | Kindo et al. | |
| 2017/0151982 A1 | 6/2017 | Fujii et al. | |
| 2017/0166254 A1 | 6/2017 | Katoh | |
| 2017/0327115 A1 | 11/2017 | Tokimasa et al. | |
| 2017/0341652 A1 | 11/2017 | Sugawara et al. | |
| 2017/0349212 A1 | 12/2017 | Oshida et al. | |
| 2017/0369072 A1 | 12/2017 | Huber | |
| 2018/0015923 A1 | 1/2018 | Kurumisawa et al. | |
| 2018/0086338 A1 | 3/2018 | Yamada et al. | |
| 2018/0118215 A1 | 5/2018 | Kim | |
| 2018/0154939 A1 | 6/2018 | Aoki | |
| 2018/0170388 A1 | 6/2018 | Shin | |
| 2018/0178790 A1 | 6/2018 | Oguri et al. | |
| 2018/0188735 A1 | 7/2018 | Sugawara et al. | |
| 2018/0215387 A1 | 8/2018 | Takae | |
| 2018/0215389 A1 | 8/2018 | Takae | |
| 2018/0253975 A1 | 9/2018 | Mizutani | |
| 2018/0261094 A1 | 9/2018 | Nishimura et al. | |
| 2018/0281785 A1 | 10/2018 | Berntorp et al. | |
| 2018/0297639 A1 | 10/2018 | Fujii | |
| 2018/0297640 A1 | 10/2018 | Fujii | |
| 2018/0345959 A1 | 12/2018 | Fujii | |
| 2018/0345960 A1 | 12/2018 | Fujii | |
| 2018/0345964 A1 | 12/2018 | Fujii et al. | |
| 2018/0346027 A1 | 12/2018 | Fujii | |
| 2018/0348779 A1 | 12/2018 | Oniwa | |
| 2019/0009818 A1 | 1/2019 | Ide | |
| 2019/0016339 A1 | 1/2019 | Ishioka | |
| 2019/0047469 A1 | 2/2019 | Nishiguchi et al. | |
| 2019/0061819 A1 | 2/2019 | Park et al. | |
| 2019/0096258 A1 | 3/2019 | Ide et al. | |
| 2019/0176832 A1 | 6/2019 | Nishiguchi et al. | |
| 2020/0247400 A1 | 8/2020 | Fujii | |
| 2020/0290677 A1 | 9/2020 | Fujii | |

FOREIGN PATENT DOCUMENTS

| | | |
|---|---|---|
| JP | 10-297522 A | 11/1998 |
| JP | 11-321690 A | 11/1999 |
| JP | 2004-34740 A | 2/2004 |
| JP | 2004-504216 A | 2/2004 |
| JP | 2005-251111 A | 9/2005 |
| JP | 2006-71425 A | 3/2006 |
| JP | 2006-315491 A | 11/2006 |
| JP | 2007-261452 A | 10/2007 |
| JP | 2008-149855 A | 7/2008 |
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-6279 A | 1/2010 |
| JP | 4929777 B2 | 5/2012 |
| JP | 2014-148293 A | 8/2014 |
| JP | 2016-126360 A | 7/2016 |
| JP | 2016-141264 A | 8/2016 |
| JP | 2016-203882 A | 12/2016 |
| JP | 2017-33060 A | 2/2017 |
| JP | 2017-65420 A | 4/2017 |
| WO | 2016/135049 A1 | 9/2016 |

(56) References Cited

FOREIGN PATENT DOCUMENTS

| WO | 2017/017793 A1 | 2/2017 |
| WO | 2017/017796 A1 | 2/2017 |
| WO | 2017/056726 A1 | 4/2017 |

OTHER PUBLICATIONS

Office Action dated Mar. 6, 2023 in U.S. Appl. No. 17/514,093.
Office Action dated Aug. 10, 2020 from the United States Patent and Trademark Office in U.S. Appl. No. 15/950,402.
Notice of Allowance dated Jun. 14, 2021 in U.S. Appl. No. 15/950,402.
Office Action dated Apr. 22, 2020 in U.S. Appl. No. 15/950,402.
Office Action dated Oct. 10, 2019 in U.S. Appl. No. 15/950,404.
Office Action dated Mar. 4, 2021 of by the USPTO in U.S. Appl. No. 15/950,402.
Notice of Allowance dated Nov. 17, 2020 from the United States Patent and Trademark Office in U.S. Appl. No. 15/950,402.
Office Action dated Feb. 16, 2012 in U.S. Appl. No. 12/527,712.
Office Action dated Jul. 25, 2019 in U.S. Appl. No. 15/991,058.
Office Action dated Aug. 12, 2019 in U.S. Appl. No. 15/991,136.
Office Action dated Aug. 12, 2019 in U.S. Appl. No. 15/991,169.
Office Action dated May 27, 2020 in U.S. Appl. No. 15/997,044.

\* cited by examiner

LANE CHANGE ASSIST APPARATUS FOR VEHICLE

CROSS-REFERENCE TO RELATED APPLICATIONS

This application is a Divisional of U.S. application Ser. No. 16/890,455 filed Jun. 2, 2020, which is a Continuation of U.S. application Ser. No. 15/950,404, filed Apr. 11, 2018 (now U.S. Pat. No. 10,814,913 issued Oct. 27, 2020), which claims benefit of Japanese Patent Application No. 2017-078664 filed Apr. 12, 2017 and Japanese Patent Application No. 2017-104434 filed May 26, 2017. The entire disclosures of the prior applications are considered part of the disclosure of the accompanying continuation application, and are hereby incorporated by reference.

BACKGROUND OF THE INVENTION

1. Field of the Invention

The present invention relates to a lane change assist apparatus for a vehicle configured to assist/support a steering operation for changing lanes.

2. Description of the Related Art

Conventionally, a lane change assist apparatus has been known which is configured to assist a steering operation (steering wheel operation) for changing lanes. Such a lane change assist apparatus calculates a target trajectory in such a manner that a vehicle changes a traveling direction of the own vehicle toward a lane (adjacent lane) being a destination of changing lanes. The lane change assist apparatus controls a steering angle of right and left steered wheels in such a manner that the vehicle travels along the calculated target trajectory.

For example, an apparatus (hereinafter referred to as a "conventional apparatus") as proposed in Japanese Patent Application Laid-Open (kokai) 2016-141264 A sets a target trajectory based on a time period which it takes for a driver to move an own vehicle in a lateral direction (lane width direction) by a predetermined distance. The conventional apparatus sets a trajectory distance of the target trajectory shorter as that time period is shorter. When the target trajectory is set, the conventional apparatus starts a lane change assist to control a steering amount in such a manner that the own vehicle travels along the target trajectory. Therefore, the driver can have the own vehicle change lanes without operating a steering wheel.

The conventional apparatus sets the target trajectory in accordance with a rotating speed of the steering wheel operated by the driver before the lane change assist is executed. However, while the lane change assist is being executed, the driver may perform an additional steering operation (that is, the driver may add/supplement a steering amount through a manual operation of the steering wheel to the steering amount controlled by the automatic steering control) because the driver wishes to complete the lane change in a shorter time. In this case, if the target trajectory set at the start of the lane change assist is used until the completion of the lane change assist, the lane change may be performed according to a trajectory along which the driver does not intend to travel.

The present invention is made to cope with the problem described above. That is, one of objects of the present invention is to provide a lane change assist apparatus which can have the own vehicle change lanes along a trajectory reflecting the intention of the driver.

In order to achieve the above-mentioned object, according to one embodiment of the present invention, there is provided a lane change assist apparatus for a vehicle, including:
  a lane recognition unit (12) for recognizing a lane to detect a relative positional relationship of an own vehicle with respect to the lane;
  a target trajectory calculation unit (10) for, based on the relative positional relationship of the own vehicle with respect to the lane, calculating a target trajectory in such a manner that the own vehicle changes lanes toward an adjacent lane; and
  an assist control unit (10, 20) for executing/performing a lane change assist control by controlling steering of a steered wheel in such a manner that the own vehicle travels along the target trajectory.

The lane change assist apparatus further includes a steering operation determination unit (S19) for determining whether or not a driver has performed a steering operation while the lane change assist control is being executed.

The target trajectory calculation unit includes:
  a first calculation unit (S13, S14) for, at a start of the lane change assist control, calculating the target trajectory along which the own vehicle is to travel from the start of the lane change assist control until a completion of the lane change assist control; and
  a second calculation unit (S22, S23) for, at a steering determination time point at which the steering operation determination unit determines that the driver has performed the steering operation, calculating the target trajectory along which the own vehicle is to travel from the steering determination time point until the completion of the lane change assist control, based on a lateral position which is a position of the own vehicle in a lane width direction at the steering determination time point, and a lateral movement state amount representing a movement state of the own vehicle in the lane width direction at the steering determination time point.
the assist control unit is configured to
control the steering of the steered wheel in such a manner that the own vehicle travels along the target trajectory calculated by the first calculation unit until the steering determination time point (at which the steering operation determination unit determines that the driver has performed the steering operation), and
control the steering of the steered wheel in such a manner that the own vehicle travels along the target trajectory calculated by the second calculation unit after the steering determination time point (at which the steering operation determination unit determines that the driver has performed the steering operation) (S15 to S18).

In the lane change assist apparatus, the lane recognition unit recognizes the lane and detects the relative positional relationship of an own vehicle with respect to the lane. The lane is, for example, an area sectioned by white lines. The target trajectory along which the own vehicle travels can be determined by recognizing the lane. The target trajectory calculation unit calculates the target trajectory for having the own vehicle change lanes toward the adjacent lane (which is a target lane for lane change), based on the relative positional relationship of the own vehicle with respect to the lane. The assist control unit executes/performs the lane change assist control to control the steering of the steered wheel in such a manner that the own vehicle travels along the target trajectory.

When the driver has performed the steering operation during the lane change assist control, if the target trajectory set/determined at the start of the lane change assist continues being used until the completion of the lane change assist as it is, the lane change may be performed along a trajectory along which the driver does not intend to travel. Therefore, the lane change assist apparatus according to the present invention includes the steering operation determination unit. The steering operation determination unit determines/confirms whether or not the driver has performed the steering operation while the lane change assist control is being executed/performed. That is, the steering operation determination unit determines whether or not the driver has operated a steering wheel. In this configuration, the steering operation determination unit may determine that the driver has performed the steering operation, when the driver has terminated the steering operation of the steering wheel.

The target trajectory calculation unit includes the first calculation unit and the second calculation unit. The first calculation unit calculates, at the start of the lane change assist control, the target trajectory along which the own vehicle is to travel from the start of the lane change assist control until/to the completion of the lane change assist control. Further, the second calculation unit calculates, at the steering determination time point at which the steering operation determination unit determines that the driver has performed the steering operation, the target trajectory along which the own vehicle is to travel from the steering determination time point until/to the completion of the lane change assist control, based on the "lateral position which is the position of the own vehicle in the lane width direction (road width direction) at the steering determination time point" and the "lateral movement state amount representing the movement state of the own vehicle in the lane width direction at the steering determination time point".

The assist control unit is configured to
control the steering of the steered wheel in such a manner that the own vehicle travels along the target trajectory calculated by the first calculation unit until the steering determination time point (at which the steering operation determination unit determines that the driver has performed the steering operation), and
control the steering of the steered wheel in such a manner that the own vehicle travels along the target trajectory calculated by the second calculation unit after the steering determination time point (at which the steering operation determination unit determines that the driver has performed the steering operation).

In this manner, at the steering determination time point at which the steering operation determination unit determines that the driver has performed the steering operation, the target trajectory is again determined/calculated (recalculated) based on the lateral position at the steering determination time point and the lateral movement state amount at the steering determination time point. Therefore, a suitable target trajectory can be determined/calculated in response to the behavior of the own vehicle which is changed by the steering operation of the driver. The steering of the steered wheel is controlled based on the suitable target trajectory. Accordingly, the own vehicle can be made to change lanes along the target trajectory reflecting the intention of the steering operation performed by the driver.

In an aspect of the present invention, the first calculation unit is configured to calculate/determine, as the target trajectory (or as a function which determines the target trajectory), a target trajectory function representing/expressing a target lateral position which is a target position of the own vehicle in the lane width direction in accordance with a first elapse time from the start of the lane change assist control, (for a period from the start of the lane change assist control) until/to the completion of the lane change assist control, and
the second calculation unit is configured to calculate, as the target trajectory (or as a function which determines the target trajectory), a target trajectory function representing/expressing a target lateral position which is a target position of the own vehicle in the lane width direction in accordance with a second elapse time from the steering determination time point, (for a period from the steering determination time point) until/to until the completion of the lane change assist control.

In the above aspect of the present invention, the first calculation unit is configured to calculate, as the target trajectory, the target trajectory function representing/expressing the target lateral position which is the target position of the own vehicle in the lane width direction in accordance with the first elapse time from the start of the lane change assist control (until the completion of the lane change assist control). Further, the second calculation unit is configured to calculate, as the target trajectory, the target trajectory function representing/expressing the target lateral position which is the target position of the own vehicle in the lane width direction in accordance with the second elapse time from the steering determination time point (until the completion of the lane change assist control). Therefore, the assist control unit controls the steering of the steered wheel in such a manner that the lateral position of the own vehicle matches (becomes equal to) the target lateral position determined based on the target trajectory function calculated by the first calculation unit until the steering determination time point (at which the steering operation determination unit determines that the driver has performed the steering operation). Further, the assist control unit controls the steering of the steered wheel in such a manner that the lateral position of the own vehicle matches (becomes equal to) the target lateral position determined based on the target trajectory function calculated by the second calculation unit after the steering determination time point (at which the steering operation determination unit determines that the driver has performed the steering operation). Therefore, the lateral position of the own vehicle can be controlled in accordance with the first elapse time or the second elapse time. Accordingly, the own vehicle can be made to change lanes along a desired trajectory.

In an aspect of the present invention, the assist control unit includes:
a target lateral state amount calculation unit (S15) for, based on the target trajectory function calculated by the first calculation unit or the second calculation unit, successively/sequentially calculating a target lateral state amount, the target lateral state amount representing a target lateral position of the own vehicle at a current time point and a target lateral movement state amount which is a target value of a movement state of the own vehicle in the lane width direction at the current time point;
a target yaw state amount calculation unit (S16) for successively/sequentially acquiring a vehicle speed of the own vehicle at the current time point, and successively/sequentially calculating a target yaw state amount which is a target value at the current time point related to a movement for changing a direction of the own vehicle, based on the vehicle speed and the target lateral movement state amount; and a steering control unit (S17, S18) for controlling the steering of the steered wheel based on the target lateral position and the target yaw state amount.

In the above aspect of the present invention, the assist control unit includes the target lateral state amount calculation unit, the target yaw state amount calculation unit, and the steering control unit. The target lateral state amount calculation unit successively/sequentially calculates the target lateral state amount, based on the target trajectory function calculated by the first calculation unit or the second calculation unit. The target lateral state amount represents the target lateral position of the own vehicle at the current time point, and the target lateral movement state amount which is the target value of the movement state of the own vehicle in the lane width direction at the current time point.

The lateral movement state amount includes, for example, a speed and/or acceleration in the lane width direction of the own vehicle. For example, by differentiating the target trajectory function with respect to time, a target lateral speed (speed in the lane width direction) of the own vehicle at an arbitrary time point can be acquired. Further, by second-order differentiating the target trajectory function with respect to time, a target lateral acceleration (acceleration in the lane width direction) of the own vehicle at an arbitrary time point can be acquired. Therefore, the target lateral movement state amount can be calculated by using the target trajectory function.

As the vehicle speed of the own vehicle is acquired, the target yaw state amount can be calculated, which is the target value related to the movement (movement for changing the direction of the own vehicle) and which is required to obtain the target lateral movement state amount of the own vehicle. Therefore, the target yaw state amount calculation unit successively/sequentially calculates the target yaw state amount which is the target value at the current time point related to the movement for changing the direction of the own vehicle, based on the vehicle speed and the target lateral movement state amount.

The steering control unit controls the steering of the steered wheel based on the target lateral position and the target yaw state amount. That is, the steering control unit controls the steering of the steered wheel in such a manner that the lateral position of the own vehicle matches (becomes equal to) the target lateral position and the yaw state amount for changing the direction of the own vehicle matches (becomes equal to) the target yaw state amount.

According to the above aspect of the present invention, the own vehicle can be made to change lanes smoothly while reflecting an accelerator pedal operation performed by the driver (that is, change in the vehicle speed).

In an aspect of the present invention, the first calculation unit is configured to calculate the target trajectory function representing/expressing the target lateral position which is the target position of the own vehicle in the lane width direction in accordance with the first elapse time from the start of the lane change assist control, based on:
  (i) an initial lateral state amount representing a lateral position of the own vehicle at the start of the lane change assist control and a lateral movement state amount which is a movement state of the own vehicle in the lane width direction at the start of the lane change assist control;
  (ii) a final target lateral state amount representing a target lateral position of the own vehicle at the completion of the lane change assist control and a target lateral movement state amount of the own vehicle at the completion of the lane change assist; and
  (iii) a target lane change time period which is a target time period from the start of the lane change assist control until the completion of the lane change assist control, and Further, the second calculation unit is configured to calculate, the target trajectory function representing the target lateral position of the own vehicle in accordance with the second elapse time from the steering determination time point, based on:
  (i) a lateral state amount at the steering determination time point representing a lateral position of the own vehicle at the steering determination time point and a lateral movement state amount of the own vehicle at the steering determination time point;
  (ii) the final target lateral state amount representing the target lateral position at the completion of the lane change assist control and the target lateral movement state amount at the completion of the lane change assist control; and
  (iii) a target lane change remaining time period which is a target remaining time period from the steering determination time point until the completion of the lane change assist control.

In the above aspect of the present invention, the first calculation unit is configured to calculate the target trajectory function representing/expressing the target lateral position which is the target position of the own vehicle in the lane width direction in accordance with the first elapse time from the start of the lane change assist control, based on the initial lateral state amount, the final target lateral state amount, and the target lane change time period. The initial lateral state amount represents the lateral position of the own vehicle at the start of the lane change assist control and the lateral movement state amount which is the movement state of the own vehicle in the lane width direction at the start of the lane change assist control. Further, the final target lateral state amount represents the target lateral position at the completion of the lane change assist control and the target lateral movement state amount at the completion of the lane change assist. In addition, the target lane change time period represents the target time period from the start of the lane change assist control until/to the completion of the lane change assist control. The lateral movement state amount includes, for example, a detection value(s) of speed and/or acceleration in the lane width direction of the own vehicle. The target lateral movement state amount includes, for example, a target value(s) of speed and/or acceleration in the lane width direction of the own vehicle. The lateral position of the own vehicle and the lateral movement state amount of the own vehicle are obtained from the relative positional relationship of the own vehicle with respect to the lane which is detected by the lane recognition unit.

On the other hand, the second calculation unit is configured to calculate, the target trajectory function representing/expressing the target lateral position of the own vehicle in accordance with the second elapse time from the steering determination time point (at which the steering operation determination unit determines that the driver has performed the steering operation), based on the lateral state amount at the steering determination time point, the final target lateral state amount, and the target lane change remaining time period. The lateral state amount at the steering determination time point represents the lateral position of the own vehicle at the steering determination time point and the lateral movement state amount at the steering determination time point. The final target lateral state amount represents the target lateral position at the completion of the lane change assist control and the target lateral movement state amount at the completion of the lane change assist control. The target lane change remaining time period is the target remaining time period from the steering determination time point until/to the completion of the lane change assist control.

Therefore, at the steering determination time point (at which the steering operation determination unit determines that the driver has performed the steering operation), the target trajectory function can be calculated, which makes the actual lateral state amount smoothly vary from the lateral state amount at that time point. As a result, the own vehicle can be made to change lanes in a smoother manner.

In an aspect of the present invention, the second calculation unit is configured to set the target remaining lane change time period based on a remaining distance at the steering determination time point which is a distance required for having the own vehicle move in the lane width direction until the completion of the lane change assist control.

In the above aspect of the present invention, the target remaining lane change time period is set/determined based on the remaining distance at the steering determination time point which is a distance required for having the own vehicle move in the lane width direction until the completion of the lane change assist control. Thus, ever if the driver operates the steering wheel during the lane change assist control, a suitable target trajectory function can be calculated/determined. Accordingly, the own vehicle can be made to change lanes along the target trajectory while reflecting the intention of the steering operation performed by the driver in a more effective manner.

In an aspect of the present invention, the second calculation unit is configured to correct/modify the target remaining lane change time period in such a manner that, the higher a lateral speed or lateral acceleration in the lane width direction of the own vehicle at the steering determination time point is, the shorter the target remaining lane change time period is.

In the above aspect of the present invention, the target remaining lane change time period is corrected/modified in such a manner that the target remaining lane change time period is shorter, as the lateral speed of the own vehicle at the steering determination time point or the lateral acceleration in the lane width direction of the own vehicle at the steering determination time point is higher. Therefore, a suitable target trajectory function can be calculated. Accordingly, the own vehicle can be made to change lanes along the target trajectory while reflecting the intention of the steering operation performed by the driver in a more effective manner.

In an aspect of the present invention, the second calculation unit is configured to calculate the target trajectory function up to once (that is, only once) during one (that is, a single consecutive) lane change assist control (S30).

During the lane change assist control, the steering operation determination unit may determine that the driver has performed the steering operation a plurality of times. If the target trajectory function is calculated/updated for each steering determination time point to control the steered wheel, the behavior of the own vehicle may be unstable. In view of this, in the above aspect of the present invention, the number of calculations of the target trajectory function is limited to up to once during one lane change assist control (that is, a period from the start of the lane change assist control to the completion of that lane change assist control). Consequently, the own vehicle can be made to change lanes stably.

In an aspect of the present invention, the second calculation unit is configured to
at the steering determination time point, calculate a deviation between the "target lateral position of the own vehicle obtained by the target trajectory function calculated by the first calculation unit" and an "actual lateral position of the own vehicle detected by the lane recognition unit", and
when the deviation (i.e., a magnitude of the deviation) is equal to or higher than a threshold and the actual lateral position is positioned at a position deviated/shifted in a lane change direction with respect to the target lateral position, calculate the target trajectory function (S31, S32, S33).

When the driver has performed the steering operation during the lane change assist control, and if the actual lateral position of the own vehicle does not greatly deviate from the target lateral position in the lane change direction, the target trajectory function calculated at the start of the lane change assist control may be used as it is (it may be continued being used). Therefore, in the above aspect of the present invention, at the steering determination time point at which the steering operation determination unit determines that the driver has performed the steering operation, the second calculation unit calculates the deviation between the "target lateral position of the own vehicle obtained by the target trajectory function calculated by the first calculation unit" and the "actual lateral position of the own vehicle detected by the lane recognition unit". When the deviation is equal to or higher than the threshold and the actual lateral position is positioned at the position deviated/shifted in the lane change direction with respect to the target lateral position, the second calculation unit calculates the target trajectory function again. Therefore, the target trajectory function is not calculated (to be switched) more than necessary. Consequently, the own vehicle can be made to change lanes stably. In addition, the calculation load of the second calculation unit can be suppressed low.

In an aspect of the present invention, the steering operation determination unit is configured to determine that the driver has performed the steering operation, when a steering torque input/applied to a steering wheel by the driver becomes equal to or higher than a first threshold for determining a start of the steering operation and thereafter becomes equal to or lower than a second threshold for determining a termination of the steering operation (S191 to S196).

In the above aspect of the present invention, when the steering torque input to a steering wheel by the driver becomes equal to or higher than the first threshold and then becomes equal to or lower than the second threshold, the steering operation determination unit determines that the driver has performed the steering operation. The first threshold is a threshold for determining the start of the operation of the steering wheel performed by the driver. The second threshold is a threshold for determining the termination of the operation of the steering wheel performed by the driver. Therefore, the second threshold is lower than the first threshold. Consequently, it can be easy to determine that the driver has performed the steering operation.

In the above description, references used in the following descriptions regarding embodiments are added with parentheses to the elements of the present invention, in order to assist in understanding the present invention. However, those references should not be used to limit the scope of the invention.

DETAILED DESCRIPTION OF THE EMBODIMENTS

A lane change assist apparatus according to the present invention will next be described with reference to the drawings.

Figure 1:
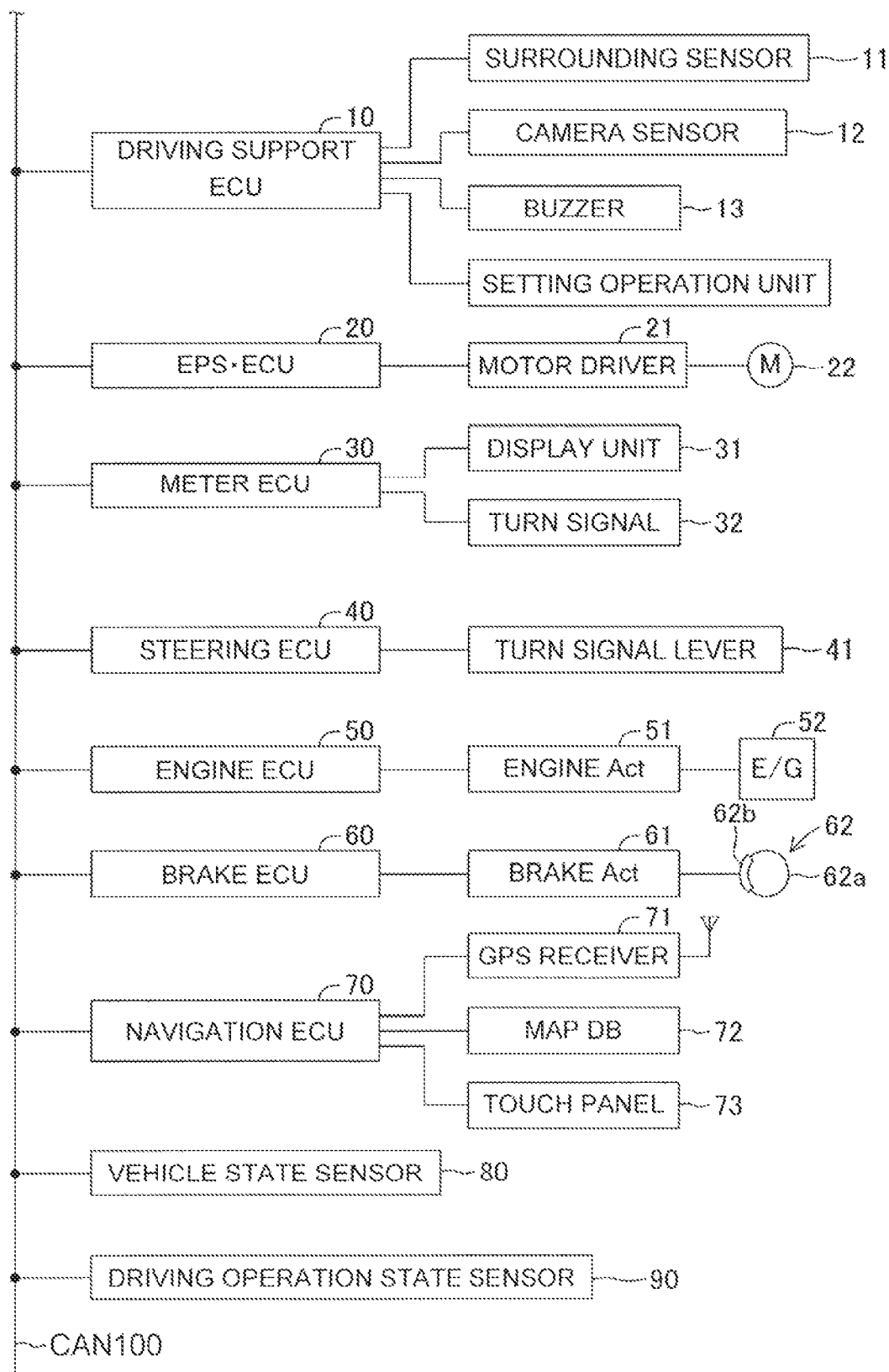
FIG. 1 is a schematic configuration diagram for illustrating a lane change assist apparatus for a vehicle according to an embodiment of the present invention.

The lane change assist apparatus according to the embodiment of the present invention is applied to a vehicle (hereinafter also referred to as an "own vehicle" in order to be distinguished from other vehicles). The lane change assist apparatus, as illustrated in FIG. 1, includes a driving support (assist) ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

Further, a plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed (hereinafter also referred to as a "vehicle speed v") of the vehicle, a front-rear G sensor configured to detect an acceleration in a front-rear direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (hereinafter, referred to as "sensor information") detected by the vehicle state sensors 80 and the driving operation state sensors 90 is transmitted to the CAN 100. Each ECU can use the sensor information transmitted to the CAN 100 as appropriate. The sensor information may be information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
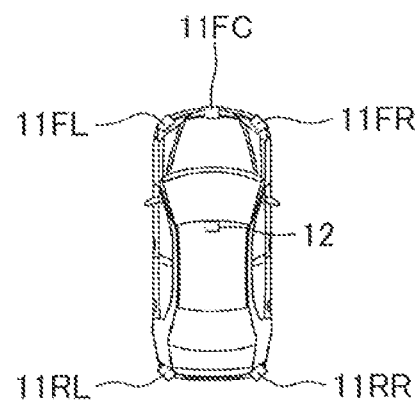
FIG. 2 is a plan view for illustrating disposing positions of surrounding sensors and a camera sensor.

The driving support ECU 10 is a control device serving as a central device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions. In the following, the surrounding sensors 11FC, 11FR, 11FL, 11RR, and 11RL are referred to as "surrounding sensors 11" when the sensors are not required to be individually distinguished from one another.

Each of the surrounding sensors 11 includes a radar transceiver (radar transmitting/receiving part) (not shown) and a signal processor (not shown). The radar transceiver radiates a radio wave in a millimeter waveband (hereinafter referred to as a "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter referred to as "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. By using the surrounding information, the driving support ECU 10 can detect (i) a front-rear direction component and a lateral direction component of the distance between the own vehicle and the three-dimensional object, and (ii) a front-rear direction component and a lateral direction component of the relative speed between the own vehicle and the three-dimensional object.

As illustrated in FIG. 2, the front-center surrounding sensor 11FC is disposed at a front-center portion of a vehicle body, and detects a three-dimensional object present in a front region of the own vehicle. The front-right surrounding sensor 11FR is disposed at a front-right corner portion of the vehicle body, and mainly detects a three-dimensional object present in a front-right region of the own vehicle. The front-left surrounding sensor 11FL is disposed at a front-left corner portion of the vehicle body, and mainly detects a three-dimensional object present in a front-left region of the own vehicle. The rear-right surrounding sensor 11RR is disposed at a rear-right corner portion of the vehicle body, and mainly detects a three-dimensional object present in a rear-right region of the own vehicle. The rear-left surrounding sensor 11RL is disposed at a rear-left corner portion of the vehicle body, and mainly detects a three-dimensional object present in a rear-left region of the own vehicle.

In this embodiment, the surrounding sensors 11 are radar sensors, but other sensors such as clearance sonars and LIDAR (Laser Imaging Detection and Ranging) sensors can be employed instead.

Further, a camera sensor 12 is connected to the driving support ECU 10. The camera sensor 12 includes a camera unit and a lane recognition unit. The lane recognition unit analyzes image data obtained based on an image taken by the camera unit to recognize a white line(s) of a road. The camera sensor 12 (camera unit) photographs a landscape in front (ahead) of the own vehicle. The camera sensor 12 (lane recognition unit) supplies information on the recognized white line(s) to the driving support ECU 10 every time a predetermined time period elapses.

The camera sensor 12 recognizes a lane which is a region sectioned by the white lines, and detects a relative positional relationship of the own vehicle with respect to the lane based on a positional relationship between the white lines and the own vehicle. Hereinafter, the "position" of the own vehicle means the position of the center of gravity. Further, a "lateral position" of the own vehicle to be described later means the position of the center of gravity in the lane width direction. In addition, a "lateral speed" of the own vehicle means the speed of the center of gravity of the own vehicle in the lane width direction. Furthermore, a "lateral acceleration" of the own vehicle means the acceleration of the center of gravity of the own vehicle in the lane width direction. These are calculated and obtained based on the relative positional relationship between the own vehicle and the white lines detected by camera sensor 12. In the present embodiment, the position of the own vehicle refers to the position of the center of gravity, but it is not necessarily limited to the center of gravity position. A predetermined specific position (for example, the center position of the own vehicle in plan view) of the vehicle may be adopted as the position of the own vehicle.

Figure 3:
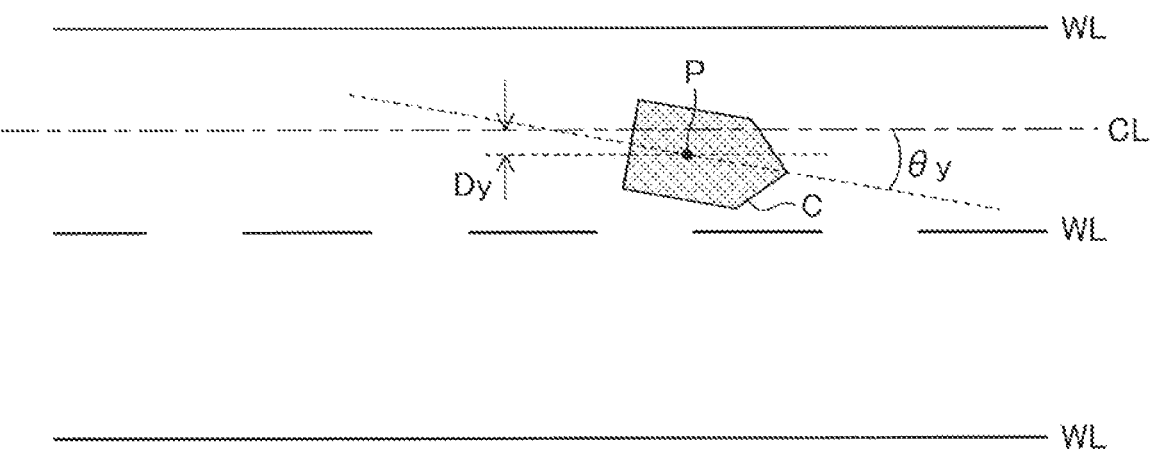
FIG. 3 is a diagram for illustrating lane-related vehicle information.

As illustrated in FIG. 3, the camera sensor 12 sets/determines a lane center line CL corresponding to a center position in a width direction of the right and left white lines WL in a lane on/in which the own vehicle is traveling. The lane center line CL is used as a target travel line in the lane trace assist control to be described later. Further, the camera sensor 12 calculates a curvature Cu of a curve of the lane center line CL.

Further, the camera sensor 12 calculates the position and the direction of the own vehicle in the lane sectioned by the right and left white lines WL. For example, as illustrated in FIG. 3, the camera sensor 12 calculates a distance Dy(m) in the lane width direction between the position P of the center of gravity of the own vehicle C and the lane center line CL, that is, the distance Dy by which the own vehicle C is shifted (deviates) from the lane center line CL in the lane width direction. This distance Dy is referred to as a "lateral difference Dy". Further, the camera sensor 12 calculates an angle formed between the direction of the lane center line CL and the direction in which the own vehicle C is facing/directing, that is, an angle θy(rad) by which the direction in which the own vehicle C is facing/directing is shifted (deviates) in a horizontal plane direction from the direction of the lane center line CL. This angle θy is referred to as a "yaw angle θy". When the lane is curved, because the lane center line CL is curved in the same manner, the yaw angle θy is an angle formed between the direction in which the own vehicle C is facing/directing and the direction of a tangent line of this curved lane center line CL. In the following, information (Cu, Dy, and θy) representing the curvature Cu, the lateral difference Dy, and the yaw angle θy is referred to as "lane-related vehicle information". Regarding the lane-related vehicle information, the lateral direction (right and left direction) with respect to the lane center line CL is specified by positive and negative signs.

Further, every time a predetermined time period elapses, the camera sensor 12 also supplies, to the driving support ECU 10, information relating to the white lines, for example, the type of the detected white line (solid line or broken line), a distance (lane width) between the right and left adjacent white lines, and the shape of the white line, on not only the lane of the own vehicle but also on adjacent lanes. When the white line is a solid line, the vehicle is inhibited from crossing the white line to change lanes. Otherwise, e.g., when the white line is a broken line (white line intermittently formed at certain intervals), the vehicle is allowed to cross the white line to change lanes. The lane-related vehicle information (Cu, Dy, and θy) and the information relating to the white lines are collectively referred to as "lane information".

In this embodiment, the camera sensor 12 calculates the lane information. Alternatively, the driving support ECU 10 may be configured to analyze the image data transmitted from the camera sensor 12 to acquire/obtain the lane information.

Further, the camera sensor 12 can also detect a three-dimensional object present in front (ahead) of the own vehicle based on the image data. Therefore, the camera sensor 12 may calculate and acquire not only the lane information but also front surrounding information. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

A buzzer 13 is connected to the driving support ECU 10. The buzzer 13 receives a buzzer sounding signal as input transmitted from the driving support ECU 10 and produces a sound. The driving support ECU 10 sounds the buzzer 13 when, for example, the driving support ECU 10 notifies/informs the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be energized by the notification ECU. In this configuration, the driving support ECU 10 transmits a buzzer sounding command to the notification ECU.

Further, in place of or in addition to the buzzer 13, a vibrator for transmitting vibration for notification for the driver may be provided. For example, the vibrator is provided to a steering wheel to vibrate the steering wheel, to thereby alert the driver.

The driving support ECU 10 executes the lane change assist control, the lane trace assist control, and the adaptive cruise control, based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is referred to as an "EPS ECU 20". The EPS ECU 20 is connected to a motor driver 21. The motor driver 21 is connected to a steering motor 22. The steering motor 22 is integrated/incorporated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) with the steering torque sensor mounted in the steering shaft, and controls energization of the motor driver 21 based on the steering torque to drive the steering motor 22. The assist motor is driven as described above to apply/add the steering torque to the steering mechanism, and thus the steering operation of the driver is assisted.

Further, when the EPS ECU 20 receives a steering command from the driving support ECU 10 via the CAN 100, the EPS ECU 20 drives the steering motor 22 at a control amount specified by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

The meter ECU 30 is connected to a display unit 31 and right and left turn signals 32 (meaning turn signal lamps and sometimes also referred to as "turn lamps"). The display unit 31 is, for example, a multi-information display mounted in front of a driver's seat, and displays various types of information in addition to values measured by meters, for example, a vehicle speed. For example, when the meter ECU 30 receives a display command in accordance with the driving support state from the driving support ECU 10, the meter ECU 30 displays a screen instructed through the display command on the display unit 31. As the display unit 31, in place of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged at a right or left position of the own vehicle according to the turn signal flashing command. Further, while the meter ECU 30 intermittently flashes the turn signal 32, the meter ECU 30 transmits, to the CAN 100, turn signal flashing information representing that the turn signal 32 is in an intermittently flashing state. Therefore, other ECUs can recognize the intermittently flashing state of the turn signal 32.

The steering ECU 40 is connected to a turn signal lever 41. The turn signal lever 41 is an operation unit for working (intermittently flashing) the turn signal 32, and is mounted in a steering column. The turn signal lever 41 is mounted to be swingable about a support shaft with/at a two-stage operation stroke in each of a clockwise operation direction and a counterclockwise operation direction.

Figure 4:
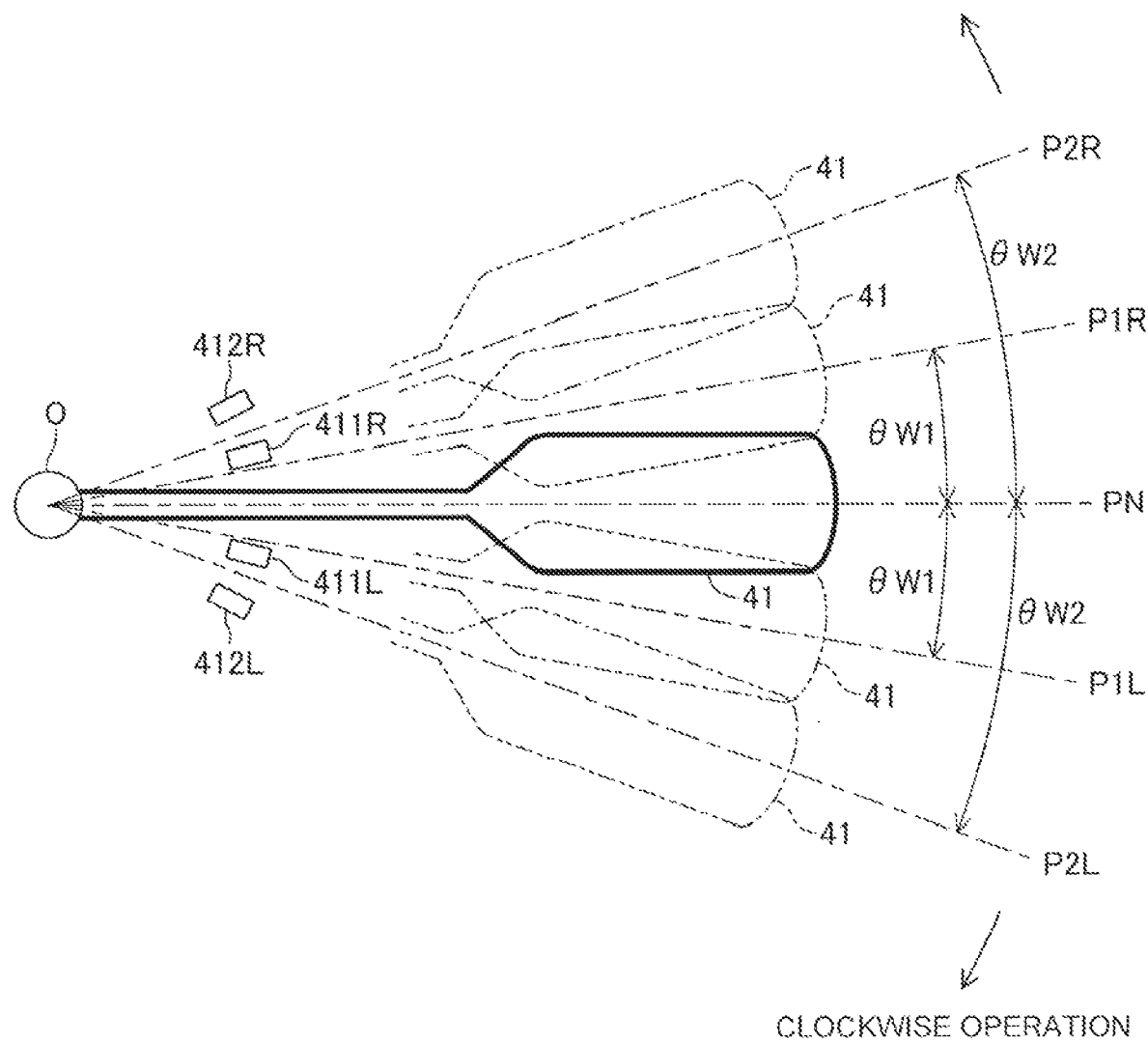
FIG. 4 is a diagram for illustrating actuation of a turn signal lever.

In this embodiment, the turn signal lever 41 is also used as an operation unit operated by the driver when the driver requires the execution of the lane change assist control. As illustrated in FIG. 4, the turn signal lever 41 is configured to be able to be operated selectively between (i) a first stroke position P1L (P1R), which is a position at which the turn signal lever 41 is rotated by a first angle $\theta W1$ from a neutral position PN, and (ii) a second stroke position P2L (P2R), which is a position at which the turn signal lever 41 is rotated by a second angle $\theta W2$ ($>\theta W1$) from the neutral position PN, in each of the clockwise operation direction and the counterclockwise operation direction about a support shaft O. In a state in which the turn signal lever 41 is in the first stroke position P1L (P1R), when the driver cancels the lever operation (that is, the driver releases his/her hand from the turn signal lever 41), the turn signal lever 41 is automatically returned to the neutral position PN. In a state in which the turn signal lever 41 is in the second stroke position P2L (P2R), even when the driver cancels the lever operation, the turn signal lever 41 is held/maintained at the second stroke position P2L (P2R) by a mechanical lock mechanism (not shown). Further, in a state in which the turn signal lever 41 is held at the second stroke position P2L (P2R), when the steering wheel is reversely rotated to be returned to the neutral position, or when the driver operates the turn signal lever 41 to return the turn signal lever 41 in the neutral position direction, the locking by the lock mechanism is released, and the turn signal lever 41 is returned to the neutral position PN.

The turn signal lever 41 includes a first switch 411L (411R) that is turned on only when the turn signal lever 41 is tilted/rotated so as to be at the first stroke position P1L (P1R), and a second switch 412L (412R) that turns on only when the turn signal lever 41 is tilted/rotated to so as to be at the second stroke position P2L (P2R).

The steering ECU 40 detects an operation state of the turn signal lever 41 based on the state of the first switch 411L (411R) and the state of the second switch 412L (412R). In each of the state in which turn signal lever 41 is tilted to the first stroke position P1L (P1R), and the state in which the turn signal lever 41 is tilted to the second stroke position P2L (P2R), the steering ECU 40 transmits to the meter ECU 30 the turn signal flashing command including information representing the operation direction (clockwise or counterclockwise direction) of the turn signal lever 41.

Further, when the steering ECU 40 detects that the turn signal lever 41 is continuously held at the first stroke position P1L (P1R) for a predetermined set time (lane-change-request-determination time: for example, 1 second) or more, the steering ECU 40 outputs/transmits to the driving support ECU 10 a lane change assist request signal including the information representing the operation direction (clockwise or counterclockwise direction) of the turn signal lever 41. Therefore, when the driver wishes to receive assistance for lane change (assistance provided by the lane change assist control) during driving, the driver may tilt the turn signal lever 41 to the first stroke position P1L (P1R) in a lane change direction, and hold the turn signal lever 41 for the predetermined set time or more. Such an operation is referred to as a "lane change assist request operation".

In this embodiment, the turn signal lever 41 is used as the operation unit for requesting the lane change assist control. Alternatively, a dedicated operation unit for requesting the lane change assist control may be provided in the steering wheel and the like.

The engine ECU 50 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration) of the own vehicle.

The brake ECU 60 is connected to a brake actuator 61. The brake actuator 61 is provided in a hydraulic circuit between a "master cylinder (not shown) configured to pressurize a working fluid in response to a stepping force on a brake pedal" and "friction brake mechanisms 62 provided at the front/rear left/right wheels". The friction brake mechanism 62 includes a brake disk 62a fixed to the wheel and a brake caliper 62b fixed to the vehicle body. The brake actuator 61 is configured to adjust a hydraulic pressure supplied to a wheel cylinder included in the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle.

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature representing the degree of the curve of the road, the road lane width, the number of lanes of the road, and the position of the lane center line CL of each lane) representing the shape and the position of the road for each section of the road. Further, the road information includes road type information for enabling distinction of whether or not the road is a road for exclusive use by automobiles, and the like.

<Control Processing Performed by Driving Support ECU 10>

Next, control processing performed by the driving support ECU 10 is described. Under a state in which both of the lane trace assist control and the adaptive cruise control are being executed, when the lane change assist request is accepted, the driving support ECU 10 executes the lane change assist control. In view of this, the lane trace assist control and the adaptive cruise control are first described.

<Lane Trace Assist Control (LTA)>

The lane trace assist control provides/generates the steering torque applied to the steering mechanism so that the position of the own vehicle is maintained in the vicinity of the target travel line inside a "lane in which the own vehicle is traveling", thereby assisting the steering operation of the driver. In this embodiment, the target travel line is the lane center line CL, but a line offset/shifted in the lane width direction by a predetermined distance from the lane center line CL can also be adopted as the target travel line.

In the following, the lane trace assist control is referred to as an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has various names. Thus, a brief description on the LTA is now given.

The driving support ECU 10 is configured to carry out the LTA when the LTA is requested through the operation applied to the setting operation unit 14. When the LTA is requested, the driving support ECU 10 calculates a target steering angle $\theta lta^*$ in accordance with Expression (1) based on the above-mentioned lane-related vehicle information (Cu, Dy, and $\theta y$) every time a predetermined time period (calculation period) elapses.

$$\theta lta^* = Klta1 \cdot Cu + Klta2 \cdot \theta y + Klta3 \cdot Dy + Klta4 \cdot \Sigma Dy \qquad (1)$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle $\theta y$ is decreased (so that the difference between the direction of the own vehicle and the lane center line CL is decreased). That is, the second term on the right-hand side is a steering angle component calculated by feed-back control with the target value of the yaw angle $\theta y$ being set to zero. The third term on the right-hand side is a steering angle component that acts in a feed-back manner so that the lateral difference Dy, which is a positional gap (positional difference) between the own vehicle and the lane center line CL in the lane width direction, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value ΣDy of the lateral difference Dy is decreased. That is, the fourth term on the right-hand side is a steering angle component calculated by feed-back control with the target value of the integral value ΣDy being set to zero.

A target steering angle θlta* becomes an angle to have the own vehicle travel toward the left direction, for example,
  when the lane center line CL curves to the left (direction),
  when the own vehicle is laterally shifted/deviated in the right direction from the lane center line CL, or
  when the own vehicle is facing/directing to the right (direction) with respect to the lane center line CL.

Further, a target steering angle θlta* becomes an angle to have the own vehicle travel toward the right direction,
  when the lane center line CL curves to the right (direction),
  when the own vehicle is laterally shifted/deviated in the left direction from the lane center line CL, or
  when the own vehicle is facing/directing to the left (direction) with respect to the lane center line CL.

Therefore, a calculation according to the Expression (1) is made with use of symbols (plus and minus) corresponding to the right/left direction.

The driving support ECU 10 outputs/transmits, to the EPS ECU 20, a command signal including information on (representing) the target steering angle θlta* that is the calculation result. The EPS ECU 20 controls (drives) the steering motor 22 so that the steering angle follows (becomes equal to) the target steering angle θlta*. In this embodiment, the driving support ECU 10 outputs/transmits the command signal including information on (representing) the target steering angle θlta* to the EPS ECU 20, but the driving support ECU 10 may calculate a target torque for obtaining the target steering angle θlta*, and output/transmit, to the EPS ECU 20, a command signal including information on (representing) the target torque that is the calculation result. The above is the outline of the LTA.

<Adaptive Cruise Control (ACC)>

When a preceding vehicle traveling immediately ahead of the own vehicle is present, the adaptive cruise control has the own vehicle follow the preceding vehicle while maintaining an inter-vehicle distance between the preceding vehicle and the own vehicle at a predetermined distance, based on the surrounding information. When there is no preceding vehicle, the adaptive cruise control has the own vehicle travel at a constant set vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to carry out the ACC when the ACC is requested through the operation applied to the setting operation unit 14. That is, the driving support ECU 10 is configured to select a following-objective-vehicle based on the surrounding information acquired from the surrounding sensors 11 when the ACC is requested. For example, the driving support ECU 10 determines whether or not an other-vehicle(s) is in a following-objective-vehicle area defined in advance.

When the other-vehicle is in the following-objective-vehicle area for a predetermined time period or more, the driving support ECU 10 selects the other-vehicle as the following-objective-vehicle. The driving support ECU 10 sets a target acceleration in such a manner that the own vehicle follows the following-objective-vehicle. Further, when no other-vehicle is present in the following-objective-vehicle area, the driving support ECU 10 sets the target acceleration based on a set vehicle speed and a detected vehicle speed (vehicle speed detected by the vehicle speed sensor) in such a manner that the detected vehicle speed of the own vehicle matches (becomes equal to) the set vehicle speed.

The driving support ECU 10 uses the engine ECU 50 to control the engine actuator 51, and, depending on necessity, uses the brake ECU 60 to control the brake actuator 61 so that the acceleration of the own vehicle matches (becomes equal to) the target acceleration. On the other hand, when the driver operates the accelerator pedal during the ACC, the driving support ECU 10 prioritizes the accelerator pedal operation over the ACC, thereby accelerating the own vehicle according to the accelerator pedal operation.

The above is the outline of the ACC.

<Lane Change Assist Control (LCA)>

The lane change assist control will next be described. After the surrounding of the own vehicle is monitored and it is determined that the own vehicle can safely change lanes, the lane change assist control provides/generates a steering torque to the steering mechanism so that the lane change assist control has the own vehicle move from the lane in which the own vehicle is currently traveling to the adjacent lane while monitoring the surrounding of the own vehicle. Thus, the driver's steering operation (lane change operation) is assisted. That is, the lane change assist control can have the own vehicle change lanes without the driver's steering operation (steering wheel operation). In the following, the lane change assist control is referred to as "LCA".

Similarly to the LTA, the LCA is control of a lateral position of the own vehicle with respect to the lane, and is executed in place of the LTA when the lane change assist request is accepted while the LTA and the ACC are being executed. In the following, the LTA and the LCA are collectively referred to as "steering assist control", and the state of the steering assist control is referred to as "steering assist control state".

Figure 5:
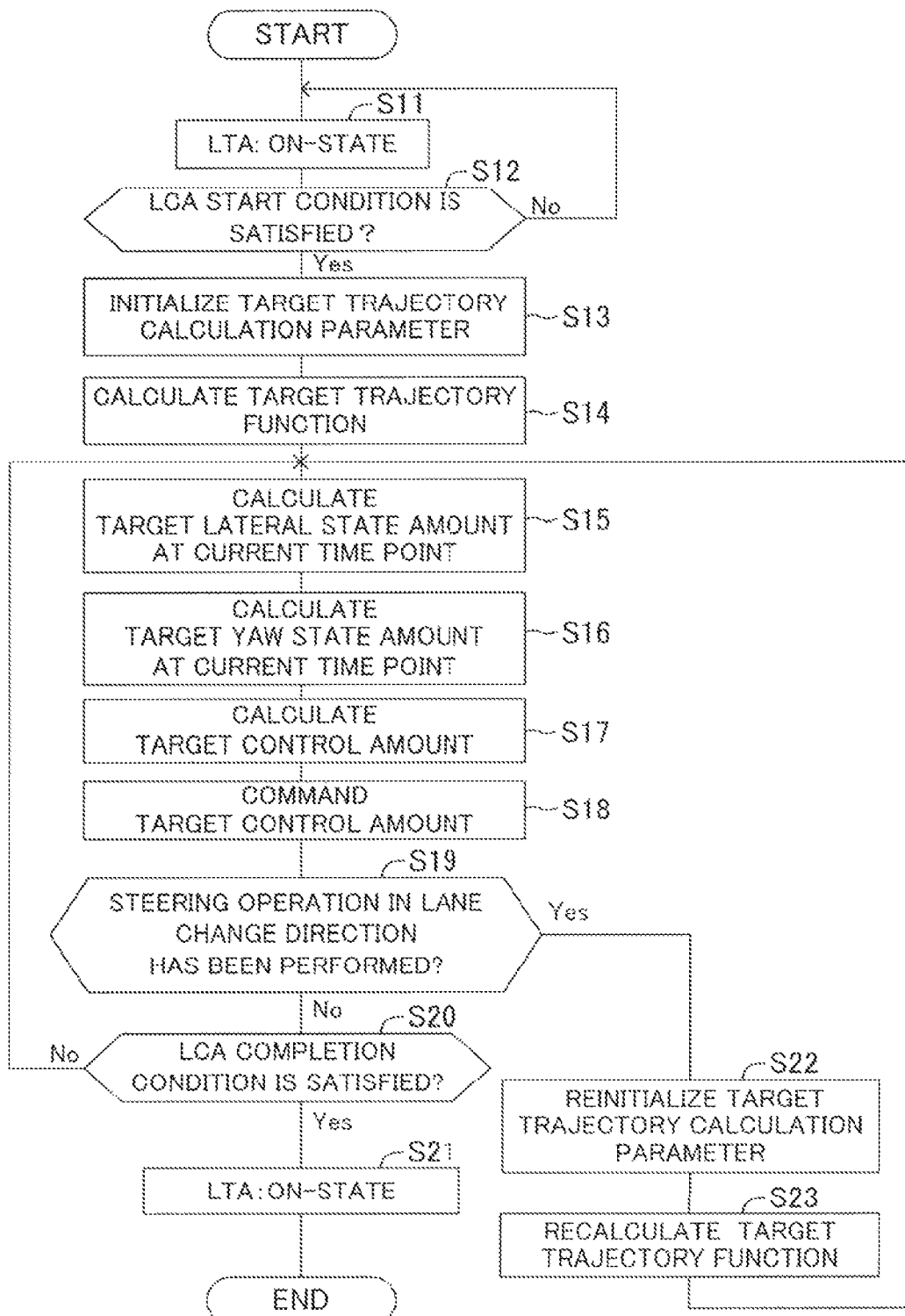
FIG. 5 is a flowchart for illustrating a steering assist control routine according to the embodiment.

FIG. 5 illustrates a steering assist control routine executed by the driving support ECU 10. The steering assist control routine is executed when a LTA execution accept condition is satisfied. The LTA execution accept condition is satisfied when all of the following conditions and the like are satisfied.
  The execution of the LTA has been selected by use of the setting operation unit 14.
  The ACC is being executed.
  The white lines have been recognized by the camera sensor 12.

As the driving support ECU 10 starts the steering assist control routine, at step S11, the driving support ECU 10 sets the steering assist control state to a "LTA ON-state" to execute the LTA. The "LTA ON-state" refers to the control state in which the LTA is executed.

Next, at step S12, the driving support ECU 10 determines whether or not a LCA start condition is satisfied.

For example, the LCA start condition is satisfied when all of the following conditions (1) to (6) are satisfied.
  1. The lane change assist request operation has been detected.

2. The execution of the LCA has been selected by use of the setting operation unit 14.
3. The white line at the side on which the turn signal 32 is flashing is a broken line. That is, the white line which is the boundary between the lane (referred to as an "original lane") in which the own vehicle is currently traveling and a lane adjacent to the original lane (referred to as an "adjacent lane" or a "target lane") is a broken line.
4. It is determined, based on the result of monitoring the surroundings of the own vehicle, that the current situation around the own vehicle is a situation in which the LCA is allowed to be executed. That is, no obstacle (e.g., other vehicles, etc.) which obstructs the lane change is detected by the surrounding sensors 11, and thus, the driving support ECU 10 has determined that the lane change can be executed safely.
5. The road on the own vehicle is traveling is a road for exclusive use of automobiles. That is, the road type information acquired from the navigation ECU 70 represents that a road on which the own vehicle is traveling is for exclusive use of automobiles.
6. The vehicle speed of the own vehicle is within a predetermined vehicle speed range for accepting the execution of the LCA.

For example, even when an other-vehicle is present in the target lane, if an inter-vehicle distance between the own vehicle and that other-vehicle traveling in the target lane is suitably/sufficiently ensured in view of a relative speed between the own vehicle and that other-vehicle, the above-mentioned condition 4 is satisfied.

The LCA start condition is not limited to the above-mentioned conditions 1 to 6. In place of one of the conditions 1 to 6, or in addition to the conditions 1 to 6, the LCA start condition may include other conditions.

When the LCA start condition is not satisfied, the driving support ECU 10 returns to step S11 and continues the execution of the LTA.

When the LCA start condition is satisfied during the execution of the LTA (S12: Yes), the driving ECU 10 executes the LCA in place of the LTA. At the start of the LCA, the driving support ECU 10 transmits to the meter ECU 30 a command for displaying start-guidance for the LCA. Therefore, the start-guidance for the LCA is displayed on the display unit 31.

When the driving support ECU 10 starts the LCA, at step S13, the driving support ECU 10 first executes a process for initializing target trajectory calculation parameters. The target trajectory calculation parameters are used for calculation of a target trajectory. The target trajectory for the LCA will be described below.

Figure 6:
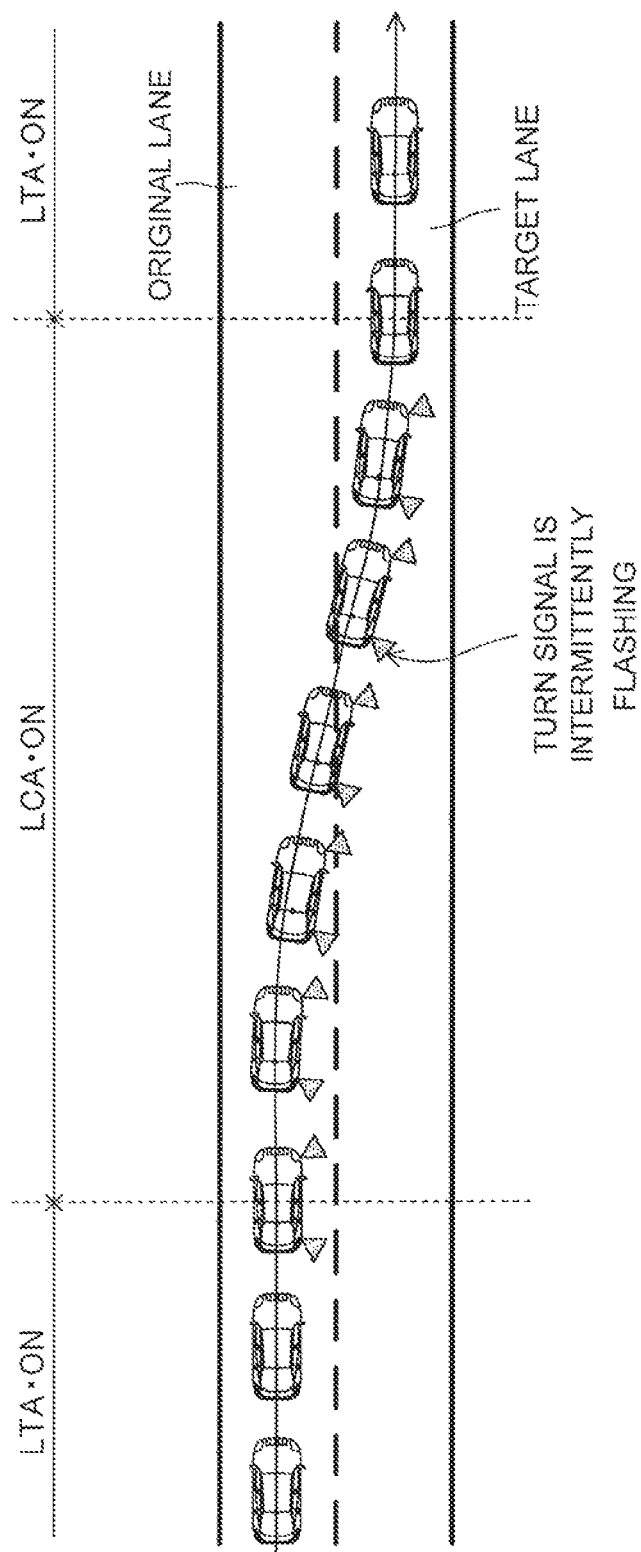
FIG. 6 is a diagram for illustrating a trajectory of the vehicle.

When executing the LCA, the driving support ECU 10 determines/specifies a target trajectory function for defining/determining the target trajectory of the own vehicle. The target trajectory is a trajectory along which the own vehicle is to be moved, for a "target lane change time period", from the lane (original lane) in which the own vehicle is currently traveling to the center position in the width direction (referred to as a "final target lateral position") of the target lane specified by the information included in the lane change assist request signal, which is adjacent to the original lane. The target trajectory has, for example, a shape as illustrated in FIG. 6.

As described later, the target trajectory function is a function of an elapsed time from the start of the LCA (as a variable), and for calculating a target lateral position of the own vehicle for (corresponding to) each elapsed time with reference to the lane center line CL of the original lane. Here, the lateral position of the own vehicle represents the position of the center of gravity of the own vehicle in the lane width direction (also referred to as a "lateral direction") with reference to the lane center line CL.

The target lane change time period is varied in proportion to a distance (hereinafter referred to as a "necessary lateral distance") required to move the own vehicle in the lateral direction from the initial (lateral) position at the start of the LCA to the final target lateral position. When the lane width is 3.5 m as in the case of typical roads, the target lane change time period is set to, for example, 8.0 seconds. This example corresponds to a case in which the own vehicle is positioned on the lane center line CL of the original lane at the start of the LCA. When the lane width is, for example, 4.0 m, the target lane change time period is set to 9.1 (=8.0×4.0/3.5) seconds which is a value corresponding to the lane width.

Further, when the lateral position of the own vehicle at the start of the LCA is shifted/deviated toward the target lane (i.e., to the adjacent lane side of a destination of changing lanes) with respect to the lane center line CL of the original lane, the target lane change time period is decreased (is made shorter) as the shift/deviation amount (magnitude of the lateral difference Dy) is increased. On the other hand, when the lateral position of the own vehicle at the start of the LCA is shifted/deviated to a side opposite to the target lane with respect to the lane center line CL of the original lane, the target lane change time period is increased (is made longer) as the shift/deviation amount (magnitude of the lateral difference Dy) is increased. For example, when the shift/deviation amount is 0.5 m, the increase/decrease adjustment amount of the target lane change time period may be 1.14 (=8.0×0.5/3.5) seconds. The above-mentioned values for setting the target lane change time period are merely examples, and thus, any other values may be adopted.

In this embodiment, the target lateral position y is calculated in accordance with the target trajectory function y(t) expressed by Expression (2). The target trajectory function y(t) is a fifth-order function of the elapsed time t serving as a variable.

$$y(t)=c_0+c_1 \cdot t+c_2 \cdot t^2+c_3 \cdot t^3+c_4 \cdot t^4+c_5 \cdot t^5 \qquad (2)$$

This target trajectory function y(t) is a function for moving the own vehicle to the final target lateral position smoothly.

In Expression (2), the constants $c_0$, $c_1$, $c_2$, $c_3$, $c_4$, and $c_5$ are determined based on a state (i.e., an "initial lateral state amount" to be described later) of the own vehicle at the start of the LCA and a target state (i.e., a "final target lateral state amount" to be described later) of the own vehicle at the completion of the LCA.

Figure 7:
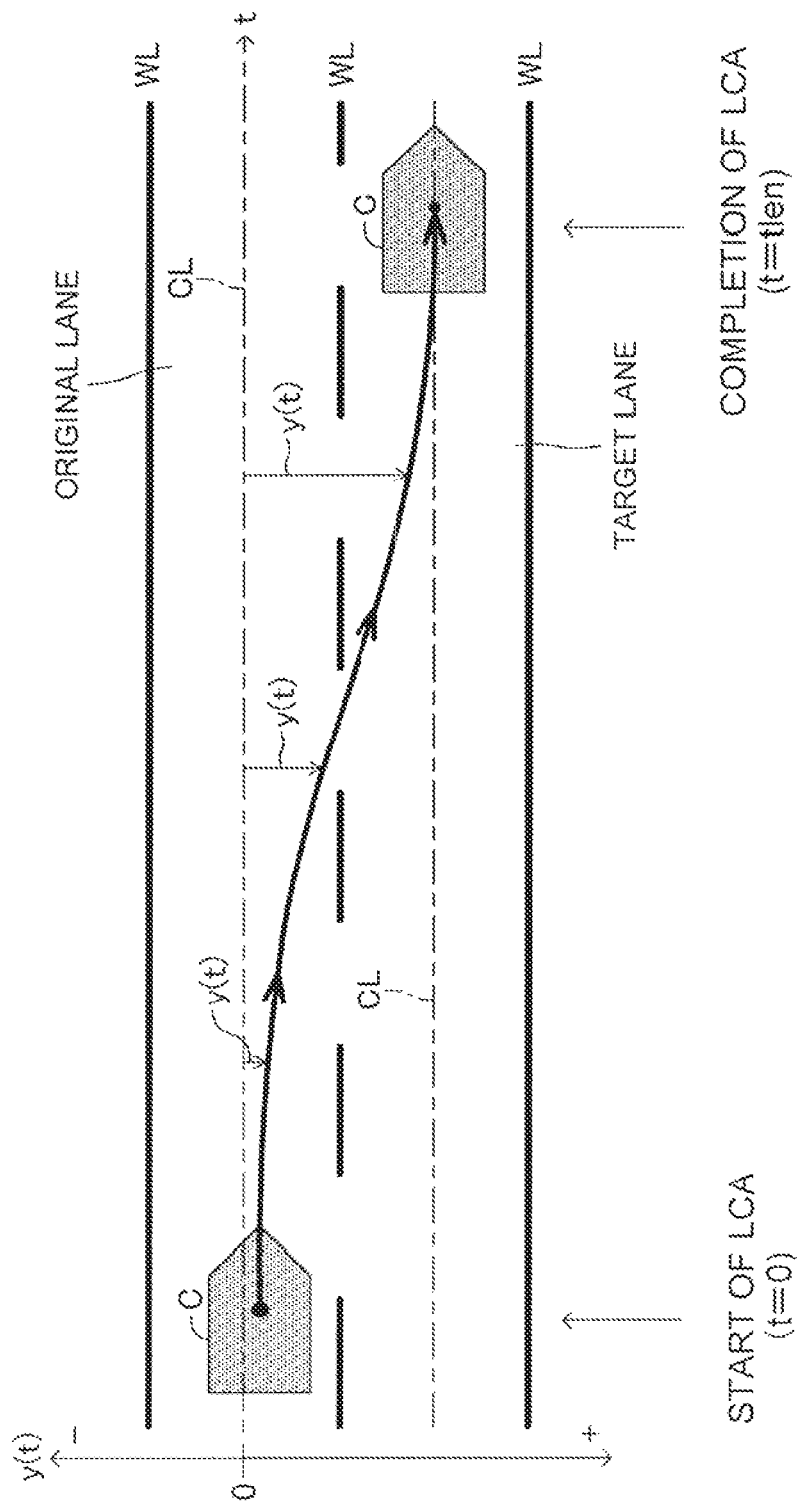
FIG. 7 is a diagram for illustrating a target trajectory function.
Figure 8:
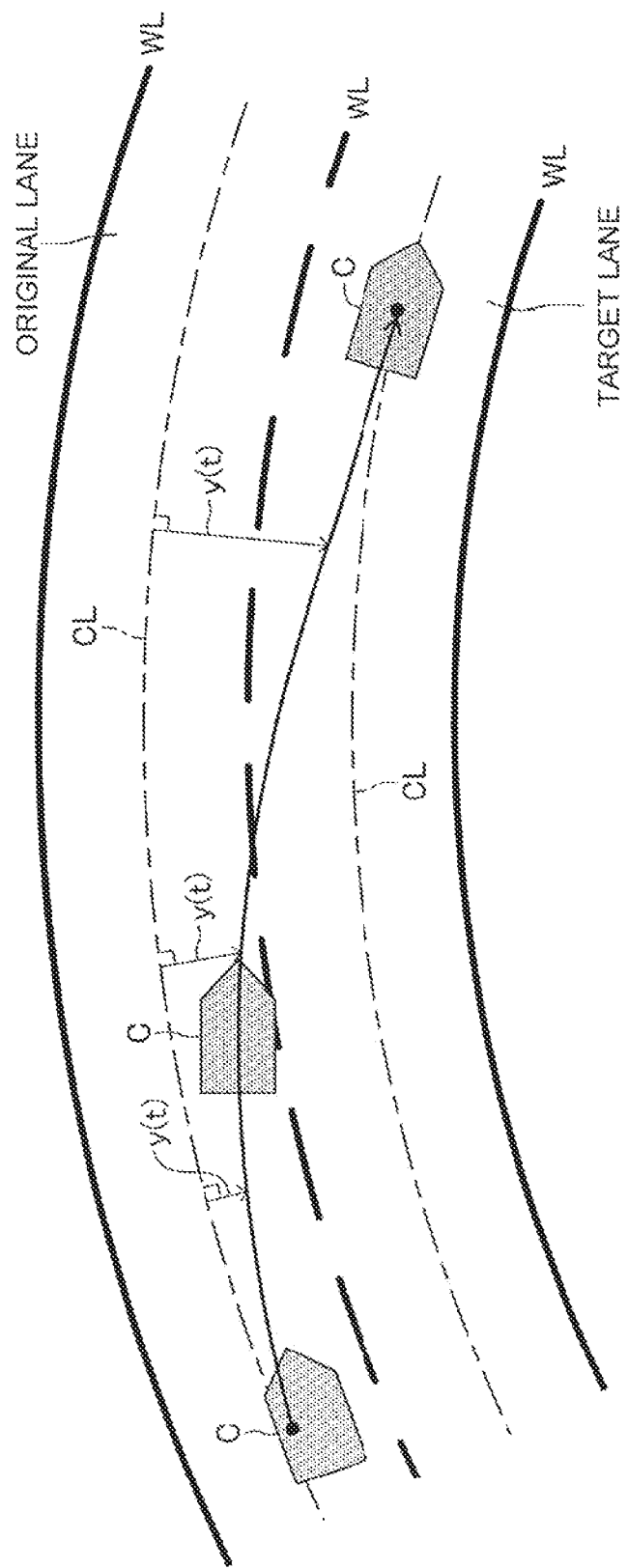
FIG. 8 is a diagram for illustrating a target trajectory function.

For example, as illustrated in FIG. 7, the target trajectory function y(t) is a function for calculating the target lateral position y(t) of the own vehicle C corresponding to an elapsed time t (also referred to as the "present time") from the start of the LCA (at the time of the calculation of the target trajectory), with reference to the lane center line CL of the lane (original lane) in which the own vehicle C is currently traveling. In FIG. 7, both of the original lane and the target lane are straight. However, in a case in which both of the original lane and the target lane are curved, as illustrated in FIG. 8, the target trajectory function y(t) can be said to be a function for calculating the target lateral position of the own vehicle C with respect to the curved lane center line CL of the original lane, using the curved lane center line CL as the reference/standard line.

The above-mentioned target trajectory calculation parameters include parameters for defining/determining the constants $c_0$, $c_1$, $c_2$, $c_3$, $c_4$, and $c_5$ of the target trajectory function y(t). Specifically, the target trajectory calculation parameters include the following parameters P1 to P7.

P1: the lateral position (hereinafter referred to as an "initial lateral position") of the own vehicle with respect to the lane center line of the original lane at the start of the LCA.

P2: the speed (hereinafter referred to as an "initial lateral speed") of the own vehicle in the lateral direction at the start of the LCA.

P3: the acceleration (hereinafter referred to as an "initial lateral acceleration") of the own vehicle in the lateral direction at the start of the LCA.

P4: the target lateral position (final target lateral position) of the own vehicle with respect to the lane center line of the original lane at the completion of the LCA.

P5: a target speed (hereinafter referred to as a "final target lateral speed") of the own vehicle in the lateral direction at the completion of the LCA.

P6: a target acceleration (hereinafter referred to as a "final target lateral acceleration") of the own vehicle in the lateral direction at the completion of the LCA.

P7: the target lane change time period which is a target time period from the start of the LCA to the completion of the LCA (i.e., a time length of a period while the LCA is executed).

Further, the above-mentioned lateral direction means the width direction of the lane.

The initial lateral position is set to the same value as the lateral difference Dy detected by the camera sensor 12 at the start of the LCA. The initial lateral speed is set to a value (v·sin(θy)) obtained by multiplying a vehicle speed v by a sine value (sin(θy)) of the yaw angle θy. The vehicle speed v is a value detected by the vehicle speed sensor at the start of the LCA, and the yaw angle θy is a value detected by the camera sensor 12 at the start of the LCA. Further, the initial lateral acceleration may be set to a differential value of the initial lateral speed. However, the initial lateral acceleration may be preferably set to a value (v·γ) obtained by multiplying a yaw rate γ (rad/s) detected by the yaw rate sensor at the start of the LCA by the vehicle speed v. This is because, in the case where the yaw rate γ (rad/s) detected by the yaw rate sensor is used, the change in the behavior of the own vehicle can be detected more quickly than in the case where the yaw angle θy detected by the camera sensor 12 is used. The initial lateral position, the initial lateral speed, and the initial lateral acceleration are collectively referred to as an "initial lateral state amount (or, index, quantity)".

In this embodiment, it is considered/regarded that the lane width of the target lane is the same as the lane width of the original lane detected by the camera sensor 12 (since the lane width of the target lane is the same as that of the original lane in most cases). Therefore, in the case where the own vehicle is traveling on the lane center line CL of the original lane, the final target lateral position is set to the same value as the lane width of the original lane (the final target lateral position=the lane width of the original lane). Further, both of the final target lateral speed and the final target lateral acceleration are set to zero. The final target lateral position, the final target lateral speed, and the final target lateral acceleration are collectively referred to as a "final target lateral state amount (or, index, quantity)".

As described above, the target lane change time period is calculated based on the lane width (which may be the lane width of the original lane) and the shift/deviation amount of the own vehicle in the lateral direction at the start of the LCA. For example, the target lane change time period "tlen" is calculated in accordance with Expression (3).

$$tlen = Dini \cdot A \qquad (3)$$

"Dini" is a necessary distance for moving the own vehicle in the lateral direction from the position (initial lateral position) at the start of the LCA to the position (final target lateral position) at the completion of the LCA. Therefore, in the case where the own vehicle is positioned at the lane center line CL of the original lane at the start of the LCA, "Dini" is set to the same value as the lane width. In the case where the own vehicle is shifted/deviated from the lane center line CL of the original lane, "Dini" is set to a value obtained by adding the shift/deviation amount to the lane width or obtained by subtracting the shift/deviation amount from the lane width. "A" is a constant which is a "target time" taken for moving the own vehicle in the lateral direction by a unit distance, and is set to 2.29 sec/m (=8 sec/3.5 m), for example. In this case, when the "required distance Dini" for moving the own vehicle in the lateral direction is 3.5 m, the "target lane change time period tlen" is set to 8 seconds. Hereinafter, the constant A is referred to as a "target time constant A".

The target time constant A is not limited to the above-mentioned value, but may be set to any value. Further, the setting operation unit 14 may be configured in such a manner that the driver can select a value as the target time constant A from a plurality of values by using the setting operation unit 14 according to the driver's preference. Alternatively, the target lane change time period may be a fixed value.

The process for initializing the target trajectory calculation parameters at step S13 is the process for setting the above-mentioned seven parameters (the initial lateral position, the initial lateral speed, the initial lateral acceleration, the final target lateral position, the final target lateral speed, the final target lateral acceleration, and the target lane change time period) in the manner described above.

After executing the process for initializing the target trajectory calculation parameters at step S13, the driving support ECU 10 executes a derivation process of (for determining) the target trajectory function at step S14. Specifically, the driving support ECU 10 calculates the constants $c_0$, $c_1$, $c_2$, $c_3$, $c_4$, and $c_5$ of the target trajectory function y(t) expressed by Expression (2) based on the initial lateral state amount, the final target lateral amount, and the target lane change time period, to thereby define/finalize the target trajectory function y(t).

The lateral speed y'(t) is expressed by Expression (4) based on the target trajectory function y(t) expressed by Expression (2). Further, the lateral acceleration y"(t) is expressed by Expression (5).

$$y'(t) = c_1 + 2 \cdot c_2 \cdot t + 3 \cdot c_3 \cdot t^2 + 4 \cdot c_4 \cdot t^3 + 5 \cdot c_5 \cdot t^4 \qquad (4)$$

$$y''(t) = 2 \cdot c_2 + 6 \cdot c_3 \cdot t + 12 \cdot c_4 \cdot t^2 + 20 \cdot c_5 \cdot t^3 \qquad (5)$$

Here, the initial lateral position is represented by "y0", the initial lateral speed is represented by "vy0", the initial lateral acceleration is represented by "ay0", the final target lateral position is represented by "y1", the final target lateral speed is represented by "vy1", the final target lateral acceleration is represented by "ay1", and the lane width of the original lane is represented by "W". Based on the above-mentioned target trajectory calculation parameters, the following Expressions are obtained.

$$y(0) = c_0 = y0 \tag{6}$$

$$y'(0) = c_1 = vy0 \tag{7}$$

$$y''(0) = 2 \cdot c_2 = ay0 \tag{8}$$

$$y(tlen) = c_0 + c_1 \cdot tlen + c_2 \cdot tlen^2 + c_3 \cdot tlen^3 + c_4 \cdot tlen^4 + c_5 \cdot tlen^5 = y1 = W \tag{9}$$

$$y'(tlen) = c_1 + 2 \cdot c_2 \cdot tlen + 3 \cdot c_3 \cdot tlen^2 + 4 \cdot c_4 \cdot tlen^3 + 5 \cdot c_5 \cdot tlen^4 = vy1 = 0 \tag{10}$$

$$y''(tlen) = 2 \cdot c_2 + 6 \cdot c_3 \cdot tlen + 12 \cdot c_4 \cdot tlen^2 + 20 \cdot c_5 \cdot tlen^3 = ay1 = 0 \tag{11}$$

Therefore, from the above Expressions (6) to (11), the constants $c_0$, $c_1$, $c_2$, $c_3$, $c_4$, and $c_5$ of the target trajectory function y(t) are obtained. Subsequently, through substituting the obtained constants $c_0$, $c_1$, $c_2$, $c_3$, $c_4$, and $c_5$ for Expression (2), the target trajectory function y(t) is derived/defined. At the same time as the derivation of the target trajectory function y(t), the driving support ECU 10 activates a clock timer (initial value: zero) to start counting up the elapsed time t from the start of the LCA.

Next, at step S15, the driving support ECU 10 calculates a target lateral state amount of the own vehicle at the current time point. The target lateral state amount includes a target lateral position which is a target value of the lateral position of the own vehicle in the lane width direction, a target lateral speed which is a target value of the speed (lateral speed) of the own vehicle in the lane width direction, and a target lateral acceleration which is a target value of the acceleration (lateral acceleration) of the own vehicle in the lane width direction. The lateral speed and the lateral acceleration are collectively referred to as a "lateral movement state amount". The target lateral speed and the target lateral acceleration are collectively referred to as a "target lateral movement state amount".

The driving support ECU 10 calculates the target lateral position at the current time point, the target lateral speed at the current time point, and the target lateral acceleration at the current time point, based on the target trajectory function y(t) derived/defined at step S14 and the present time "t". The present time "t" is the elapsed time after the target trajectory function y(t) has been derived/defined at step S14, which is equivalent to the elapsed time from the start of the LCA, as can be understood from processes described later. As described above, after the driving support ECU 10 derives/determines the target trajectory function y(t) at step S14, the driving support ECU 10 resets the clock timer to start counting up the elapsed time "t" (=the present time t) from the start of the LCA. The target lateral position is calculated through applying/assigning the present time t to the target trajectory function y(t). The target lateral speed is calculated through applying/assigning the present time t to the function y'(t) obtained by first-order differentiating the target trajectory function y(t). The target lateral acceleration is calculated through applying/assigning the present time t to the function y''(t) obtained by second-order differentiating the target trajectory function y(t). The driving support ECU 10 reads the elapsed time t measured by the clock timer. The driving support ECU 10 calculates the target lateral state amount based on the measured elapsed time t and the above-mentioned functions.

Hereinafter, the target lateral position at the present time t is represented by "y*", the target lateral speed at the present time t is represented by "vy*", and the target lateral acceleration at the present time t is represented by "av*". A functional unit/module of the driving support ECU 10 for calculating the target lateral position y*, the target lateral speed vy* and the target lateral acceleration av* at step S15 corresponds to a "target lateral state amount calculation unit" of the present invention.

Next, at step S16, the driving support ECU 10 calculates a target yaw state amount which is a target value relating to a movement for changing the direction of the own vehicle (direction of the vehicle body). The target yaw state amount includes a target yaw angle θy* of the own vehicle at the present time t (current time point t), a target yaw rate γ* of the own vehicle at the present time t (current time point t), and a target curvature Cu* of the own vehicle at the present time t (current time point t). The target curvature Cu* is the curvature of the target trajectory for having the own vehicle change lanes, that is, the curvature of a curve component related to the lane change that does not include the curve curvature of the lane.

At step S16, the driving support ECU 10 reads the vehicle speed v at the present time t (current time point t) (the current vehicle speed detected by the vehicle speed sensor). Further, the driving support ECU 10 calculates the target yaw angle θy* at the present time t (current time point t), the target yaw rate γ* at the present time t (current time point t), and the target curvature Cu* at the present time t (current time point t) in accordance with Expressions (12) to (14) described below, respectively, based on the vehicle speed v, and the target lateral speed vy* and the target lateral acceleration ay* obtained at step S15.

$$\theta y^* = \sin^{-1}(vy^*/v) \tag{12}$$

$$\gamma^* = ay^*/v \tag{13}$$

$$Cu^* = ay^*/v^2 \tag{14}$$

The target yaw angle θy* is calculated through applying/assigning a value obtained by dividing the target lateral speed vy* by the vehicle speed v to an arc sine function. Further, the target yaw rate γ* is calculated by dividing the target lateral acceleration ay* by the vehicle speed v. Further, the target curvature Cu* is calculated by dividing the target lateral acceleration ay* by a square value of the vehicle speed v. This functional unit/module of the driving support ECU 10 for calculating the target yaw angle θy*, the target yaw rate γ*, and the target curvature Cu* corresponds to a "target yaw state amount calculation unit" of the present invention.

Next, at steps S17, the driving support ECU 10 calculates a target control amount for the LCA. In this embodiment, the driving support ECU 10 calculates a target steering angle θlca* as the target control amount. The target steering angle θlca* is calculated in accordance with Expression (15) described below, based on (i) the target lateral position y* obtained at step S15, (ii) the target yaw angle θy*, the target yaw rate γ*, and the target curvature Cu* obtained at step S16, and (iii) the curvature Cu.

$$\theta lca^* = Klca1 \cdot (Cu^* + Cu) + Klca2 \cdot (\theta y^* - \theta y) + Klca3 \cdot (y^* - y) + Klca4 \cdot (\gamma^* - \gamma) + Klca5 \cdot \Sigma(y^* - y) \tag{15}$$

In Expression (15), Klta1, Klta2, Klta3, and Klta4 are control gains. "Cu" is the curvature at the present time t (current time point t) (at the time of the calculation of θlca*), the curvature Cu being detected by the camera sensor 12. "y" is the lateral position of the own vehicle at the present time t (current time point t) (at the time of the calculation of θlca*), the lateral position y being detected by the camera sensor 12, that is, corresponds to Dy. "θy" is the yaw angle of the own vehicle at the present time t (current time point t) (at the time of the calculation of θlca*), the yaw angle θy being detected by the camera sensor 12. Further, "γ" is the yaw rate of the own vehicle at the present time t (current time point t), the yaw rate γ being detected by the yaw rate sensor. The control gain Klta1 may be varied in response to the vehicle speed. A differential value of the yaw angle θy may be used as the yaw rate γ.

The first term on the right-hand side of the Expression (15) is a steering angle component which is determined in accordance with a sum of the target curvature C* and the curvature Cu (the curve curvature of the lane) and acts in a feed-forward manner. "Klca1·Cu*" is a feed-forward control amount for having the own vehicle change lanes, and "Klca1·Cu" is a feed-forward control amount for having the own vehicle travel along a curved lane with the curvature Cu. The second term on the right-hand side of the Expression (15) is a steering angle component that acts in the feed-back manner so that the deference between the target yaw angle θy* and the actual yaw angle θy is decreased. The third term on the right-hand side of the Expression (15) is a steering angle component that acts in a feed-back manner so that the difference between the target lateral position y* and the actual lateral position y is decreased. The fourth term on the right-hand side of the Expression (15) is a steering angle component that acts in a feed-back manner so that the difference between the target yaw rate γ* and the actual yaw rate γ is decreased. The fifth term on the right-hand side of the Expression (15) is a steering angle component that acts in a feed-back manner so that an integral value Σ(y*−y) of the difference between the target lateral position y* and the actual lateral position y is decreased. Therefore, the first term on the right-hand side of the Expression (15) represents the feed-forward control amount, and the second to fifth terms on the right-hand side of the Expression (15) represent the feed-back control amount(s).

The calculation method of the target steering angle θlca* is not limited to the above-mentioned method where the target steering angle θlca* is calculated by using the above-mentioned five steering angle components. The target steering angle θlca* may be calculated by using at least one steering angle component among the above-mentioned five steering angle components, or may be calculated by using any other steering angle component(s) in addition to the above-mentioned five steering angle components or in place of at least one of the above-mentioned five steering angle components. As the feed-back control amount relating to the yaw movement, either one of the "deference between the target yaw angle θy* and the actual yaw angle θy" and the "difference between the target yaw rate γ* and the actual yaw rate γ" may be used. Further, the feed-back control amount using the integral value Σ(y*−y) of the difference between the target lateral position y* and the actual lateral position y may be omitted.

After calculating the target control amount at step S17, at the next step S18, the driving support ECU 10 transmits a steering command including information on (representing) the target control amount to the EPS ECU 20. In this embodiment, the driving support ECU 10 calculates the target steering angle θlca* as the target control amount. However, the driving support ECU 10 may calculate a target torque corresponding to the target steering angle θlca* and transmit a steering command including information on (representing) the target torque to the EPS ECU 20.

When the EPS ECU 20 receives the steering command transmitted from the driving support ECU 10 via the CAN 100, the EPS ECU 20 drives (controls) the steering motor 22 in such a manner that the steering angle follows (becomes equal to) the target steering angle θlca*.

Next, at step S19, the driving support ECU 10 determines/confirms whether or not the driver has performed the steering operation in the lane change direction (that is, the driver has operated/rotated the steering wheel in a direction corresponding to the lane change direction). For example, when the lane change in the right direction is being executed through the LCA, the driving support ECU 10 determines whether or not the driver has operated/rotated the steering wheel in the right direction (clockwise direction). On other hand, when the lane change in the left direction is being executed through the LCA, the driving support ECU 10 determines whether or not the driver has operated/rotated the steering wheel in the left direction (counterclockwise direction). At step 19, the driving support ECU 10 determines that the driver has performed the steering operation, only when the driver has terminated the steering operation after the driver started that operation. Therefore, at step S19, the driving support ECU 10 makes a "Yes" determination at the time point when one steering operation (a single consecutive steering operation) has been terminated.

When the driving support ECU 10 determines that the driver has not performed the steering operation in the lane change direction, the driving support ECU 10 makes a "No" determination at step S19, and then proceeds the process to step S20.

At step S20, the driving support ECU 10 determines whether or not a LCA completion condition is satisfied. In this embodiment, the LCA completion condition is satisfied when the lateral position y of the own vehicle reaches the final target lateral position y*. When the LCA completion condition is not satisfied (S20:No), the driving support ECU 10 returns the process to step S15, and repeats the above-mentioned processes. Therefore, the driving support ECU 10 repeats the processes of steps S15 to S20 every time the predetermined time period elapses. Therefore, the target lateral state amount (y*, vy*, and ay*) is calculated in response to the elapsed time t, and then, the target yaw state amount (θy*, γ*, and Cu*) is calculated based on the calculated target lateral state amount (y*, vy*, and ay*). Further, the target control amount (θlca*) is calculated based on the calculated target yaw state amount (θy*, γ*, and Cu*).

Every time the driving support ECU 10 calculates/updates the target control amount (θlca*), the driving support ECU 10 transmits the steering command including the information on (representing) the target control amount (θlca*) to the EPS ECU 20. In this manner, the driving support ECU 10 can have the own vehicle travel along (according to) the target trajectory.

When the driving support ECU 10 determines that the LCA completion condition is satisfied at step S20, the driving support ECU 10 sets the steering assist control state to the LTA ON-state at step S21. That is, the driving support ECU 10 terminates/ends the LCA and resumes the LTA. Therefore, the steering assist control (LTA) is performed in such a manner that the own vehicle travels along (according to) the lane center line CL of the target lane.

The driving support ECU 10 receives from the camera sensor 12 the lane-related vehicle information (Cu, Dy, and θy) relating to the lane in which the own vehicle is currently traveling. When the traveling position of the own vehicle is switched from the original lane to the target lane, the lane-related vehicle information (Cu, Dy, and θy) to be transmitted from the camera sensor 12 to the driving support ECU 10 is switched from the lane-related vehicle information (Cu, Dy, and θy) associated with the original lane to the lane-related vehicle information (Cu, Dy, and θy) associated with the target lane. Therefore, when the traveling position of the own vehicle is switched from the original lane to the target lane, the sign (plus or minus) of the lateral difference Dy is reversed. When the driving support ECU 10 has detected the change in the sign of the lateral difference Dy transmitted from the camera sensor 12, the driving support ECU 10 shifts the target trajectory function y(t) expressed by Expression (2) by the lane width W. Specifically, the driving support ECU 10 converts the target trajectory function y(t) expressed by Expression (2) into a target trajectory function y(t) expressed by Expressions (2A) or (2B) described below depending on the lane change direction, by substantially shifting the target trajectory function y(t) expressed by Expression (2) by the lane width W. Therefore, the apparatus according to the present embodiment can convert "the target trajectory function calculated based on the lane center line of the original lane which serves as the origin" into "the target trajectory function based on the lane center line of the target lane which serves as the origin".

$$y(t) = W - |c_0 + c_1 \cdot t + c_2 \cdot t^2 + c_3 \cdot t^3 + c_4 \cdot t^4 + c_5 \cdot t^5| \tag{2A}$$

$$y(t) = (W - |c_0 + c_1 \cdot t + c_2 \cdot t^2 + c_3 \cdot t^3 + c_4 \cdot t^4 + c_5 \cdot t^5|) \tag{2B}$$

When the driving support ECU 10 determines that the driver has performed the steering operation in the lane change direction during the execution of the LCA, the driving support ECU 10 makes a "Yes" determination at step S19, and then, proceeds the process to step S22.

Figure 9:
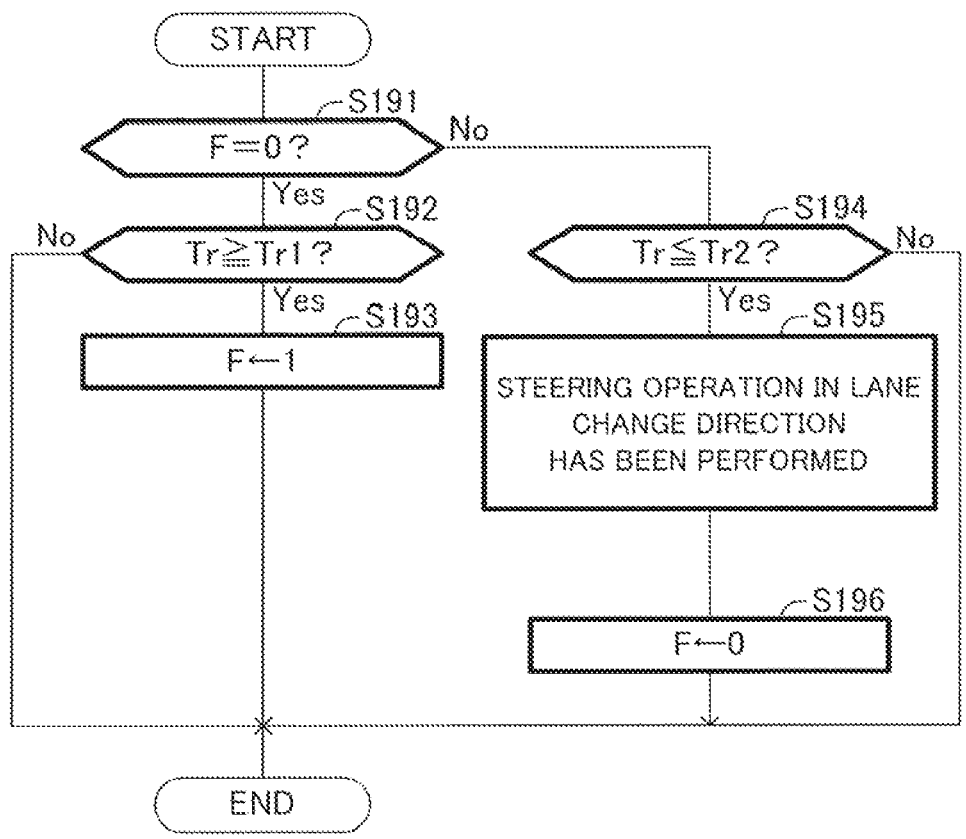
FIG. 9 is a flowchart for illustrating a steering operation determination routine according to the embodiment.

The process at step 19 for determining the steering operation performed by the driver will be described more specifically below. The driving support ECU 10 executes a steering operation determination routine illustrated in FIG. 9 in parallel with the steering assist control routine. The driving support ECU 10 executes the steering operation determination routine every time a predetermined time period elapses. At step S191, the driving support ECU 10 first determines/confirms whether or not a steering start flag F is zero.

When the steering start flag F is zero, at step S192, the driving support ECU 10 determines whether or not the steering torque Tr detected by the steering torque sensor is equal to or higher than a first threshold Tr1. This first threshold Tr1 is a threshold for determining the start of the steering operation performed by the driver in the lane change direction. When the steering torque Tr is a torque in the opposite direction to the lane change direction, the driving support ECU 10 always makes a "No" determination at step S192. Further, when the steering torque Tr is compared (at step S191) with the first threshold, the absolute value of the steering torque Tr is used.

When the steering torque Tr is lower than the first threshold Tr1 (S192:No), the driving support ECU 10 tentatively terminates the steering operation determination routine. The driving support ECU 10 executes the steering operation determination routine every time the predetermined time period elapses. When the steering torque Tr becomes equal to or higher than the first threshold Tr1 (S192:Yes) while the steering operation determination routine is repeated, the driving support ECU 10 determines that the driver has started the steering operation in the lane change direction. Next, at step S193, the driving support ECU 10 sets the steering start flag F to "1" (F←1), and then, tentatively terminates the steering operation determination routine.

When the driving support ECU 10 resumes the steering operation determination routine after setting the steering start flag F to "1", the driving support ECU 10 makes a "No" determination at step S191. In this case, at step S194, the driving support ECU 10 determines whether or not the steering torque Tr detected by the steering torque sensor is equal to or lower than a second threshold Tr2. This second threshold Tr2 is a threshold for determining the termination of the steering operation in the lane change direction performed by the driver. The second threshold Tr2 is lower than the first threshold Tr1.

When the steering torque Tr has not decreased to the second threshold Tr2 or lower (S194: No), the driving support ECU 10 tentatively terminates the steering operation determination routine. The driving support ECU 10 executes the above-mentioned processes every time the predetermined time period elapses. When the steering torque Tr has decreased to the second threshold Tr2 or lower (S194:Yes) while the steering operation determination routine is repeated, the driving support ECU 10 determines that the driver has terminated the steering operation in the lane change direction. Next, at step S195, the driving support ECU 10 determines that the driver has performed the steering operation in the lane change direction.

When the driving support ECU 10 determines that the driver has performed the steering operation in the lane change direction at step S195, the driving support ECU 10 resets the steering start flag F (F←0) at step S196, and then, tentatively terminates the steering operation determination routine.

After the driving support ECU 10 determines that the driver has performed the steering operation in the lane change direction at step S195, the driving support ECU 10 makes a "Yes" determination at step S19 in the steering assist control routine. According to this routine for determining the steering operation, the determination can easily be made as to whether the driver has performed the steering operation.

In addition, a case is considered where the LCA is started while the driver is performing the steering operation (for example, the vehicle is traveling on a curved lane). In this case, when the driving support ECU 10 determines that the driver has terminated the steering operation (that is, the steering torque Tr has decreased to the second threshold Tr2 or lower) after the start of the LCA, the driving support ECU 10 determines that the driver has performed the steering operation. Therefore, for determining that the driver has performed the steering operation, the driving support ECU 10 does not necessarily have to detect the start of the steering operation by the driver after the start of the LCA. The driving support ECU 10 may detect at least the termination of the steering operation during the execution of the LCA.

The steering assist control routine (FIG. 5) will be again described below. When the driving support ECU 10 determines that the driver has performed the steering operation (S19:Yes), at step S22, the driving support ECU 10 reinitializes the target trajectory calculation parameters. At this step S22, the driving support ECU 10 recalculates the target trajectory calculation parameters at the present time (time at which it is determined that the driver has performed the steering operation: this is also referred to as a "steering determination time point tst"). The target trajectory calculation parameters include the following seven parameters (P11 to P17).

P11: the lateral position (hereinafter referred to as a "lateral position yst") of the own vehicle with respect to the lane center line at the steering determination time point tst.

P12: the speed (hereinafter referred to as a "lateral speed vyst") of the own vehicle in the lateral direction at the steering determination time point tst.

P13: the acceleration (hereinafter referred to as a "lateral acceleration ayst") of the own vehicle in the lateral direction at the steering determination time point tst.

P14: the target lateral position (final target lateral position) of the own vehicle with respect to the lane center line at the completion of the LCA.

P15: the target speed (final target lateral speed) of the own vehicle in the lateral direction at the completion of the LCA.

P16: the target acceleration (final target lateral acceleration) of the own vehicle in the lateral direction at the completion of the LCA.

P17: the target lane change time period which is modified based on a target remaining time period to the completion of the LCA (hereinafter referred to as a "target lane change remaining time period test").

Regarding the lateral position yst which is the target trajectory calculation parameter P11, the lateral speed vyst which is the target trajectory calculation parameter P12, and the lateral acceleration ayst which is the target trajectory calculation parameter P13, actual detection values of those parameters are used, respectively. For example, the lateral position yst which is the target trajectory calculation parameter P11 is set to the same value as the lateral difference Dy1 detected by the camera sensor 12 at the steering determination time point tst. The lateral speed vyst which is the target trajectory calculation parameter P12 is set to a value (v1·sin(θy1)) obtained by multiplying a vehicle speed v1 by a sine value (sin(θy1)) of a yaw angle θy1. Here, the vehicle speed v1 is a value detected by the vehicle speed sensor at the steering determination time point tst, and the yaw angle θy1 is a value detected by the camera sensor 12 at the steering determination time point tst. Further, the lateral acceleration ayst which is the target trajectory calculation parameter P13 may be set to a differential value of the lateral speed vyst. However, the lateral acceleration ayst may be preferably set to a value (v1·γ1) obtained by multiplying a yaw rate γ1 (rad/s) detected by the yaw rate sensor at the steering determination time point tst by the vehicle speed v1.

In a case where the own vehicle is present in the original lane, the lateral difference Dy1 and the yaw angle θy1 are detected on the basis of (with respect to) the lane center line CL of the original lane. On the other hand, in a case where the own vehicle is present in the target lane, the lateral difference Dy1 and the yaw angle θy1 are detected on the basis of (with respect to) the lane center line CL of the target lane.

Hereinafter, the lateral speed vyst and the lateral acceleration ayst are collectively referred to as a "lateral movement state amount Mst" at the steering determination time point tst. The lateral position yst and the lateral movement state amount Mst are collectively referred to as a "lateral state amount Mkst" at the steering determination time point tst.

The final target lateral position which is the target trajectory calculation parameter P14 is set to a position on the lane center line CL of the target lane. Further, both the final target lateral speed which is the target trajectory calculation parameter P15 and the final target lateral acceleration which is the target trajectory calculation parameter P16 are set to zero.

The target lane change remaining time period trest* which is related to the target trajectory calculation parameter P17 is calculated based on the target time constant A, and a remaining distance (referred to as "Drest") at the steering determination time point tst which is a distance required for having the own vehicle move in the lane width direction to (until) the completion of the LCA. The remaining distance Drest represents a distance in the lane width direction from (between) the lateral position yst specified by the lateral difference Dy detected by the camera sensor 12 at the steering determination time point tst to (and) the final target lateral position.

The target lane change remaining time period trest* is calculated in accordance with Expression (16).

$$trest^* = Drest \cdot A \qquad (16)$$

The driving support ECU 10 modifies/corrects the target lane change time period tlen based on the steering determination time point tst and the target lane change remaining time period trest*. Here, it is assumed that an elapse time from the start of the LCA (t=0) to the steering determination time point tst is "tst". Therefore, the target lane change time period tlen is again calculated and set according to Expression (17).

$$tlen = tst + trest^* \qquad (17)$$

The driving support ECU 10 reinitializes the target trajectory calculation parameter at step S22, and then, the driving support ECU 10 determines again (recalculates) the target trajectory function at step S23. Specifically, the driving support ECU 10 calculates the constants $c_0, c_1, c_2, c_3, c_4$, and $c_5$ of the target trajectory function y(t) expressed by Expression (2) based on the lateral state amount Mkst at the steering determination time point tst, the final target lateral state amount, and the target lane change time period tlen, which are set at step S22. In such a way, the driving support ECU 10 again defines the target trajectory function y(t).

For example, the constants $c_0, c_1, c_2, c_3, c_4$, and $c_5$ can be calculated in accordance with the following conditions for reinitializing the target trajectory calculation parameters:

$$y(tst) = yst$$

$$y'(tst) = vyst$$

$$y''(tst) = ayst$$

$$y(tlen) = W$$

$$y'(tlen) = 0$$

$$y''(tlen) = 0$$

Consequently, the target trajectory function f(t) can be set/determined, which enables a state of the own vehicle to be transit/vary smoothly from the lateral state at the steering determination time point tst to the final target lateral state.

If the own vehicle is present in the target lane at the steering determination time point tst, the target trajectory function y(t) is modified/converted in such a manner that the lane center line CL of the target lane is the origin. The lateral difference Dy with respect to the lane center line CL of the target lane is used as the lateral position yst at the steering determination time point tst. Therefore, y(tlen) is set to be equal to "0" in place of "W" (that is, y(tlen)=0).

After the driving support ECU 10 has completed the recalculation of the target trajectory function y(t), the driving support ECU 10 proceeds the process to step S15, and repeats the above-mentioned processes. In this manner, the vehicle can travel along the newly generated target trajectory (that is, the recalculated target trajectory).

When the driving support ECU 10 determines that the LCA completion condition is satisfied at step S20, the driving support ECU 10 sets the steering assist control state to the LTA ON-state at step S21. That is, the driving support ECU 10 terminates/ends the LCA and resumes the LTA. Therefore, the steering assist control (LTA) starts to be performed in such a manner that the own vehicle travels along (according to) the lane center line CL of the target lane. After the driving support ECU 10 sets the steering assist control state to the LTA ON-state, the driving support ECU 10 proceeds the process to step S11, and repeats the above-mentioned processes.

Further, during a period in which the driving support ECU 10 is executing the LCA, the driving support ECU 10 continues transmitting, to the meter ECU 30, a flashing command to intermittently flash the turn signal 32 (at the side) corresponding to the operation direction of the turn signal lever 41. The turn signal 32 starts to be intermittently-flashed before the LCA is started, in response to the flashing command which starts to be transmitted from the steering ECU 40 when the turn signal lever 41 is operated to be positioned at the first stroke position P1L (P1R). Even when and after the steering ECU 40 stops transmitting the flashing command, the turn signal 32 continues intermittently-flashing in response to the flashing command transmitted from the driving support ECU 10. In this case, a time point at which intermittently-flashing of the turn signal 32 is terminated may be the same as the timepoint of the completion of the LCA or before the completion of the LCA. For example, the intermittently-flashing of the turn signal 32 may be terminated when the own vehicle reaches a lateral position which is away (in the original lane side) from the final target lateral position by a predetermined extinguishment permission distance (for example, 50 cm).

According to the above-described lane change assist apparatus, when the LCA is started, the target trajectory function is calculated (determined through the calculation), and then, the steering angle is controlled in such a manner that the own vehicle travels along the target trajectory set/determined by use of the calculated target trajectory function (that is, the lateral state of the own vehicle matches (becomes equal to) the target lateral state in accordance with the elapsed time from the start of the LCA). When it is determined that the driver has performed the steering operation in the lane change direction during the LCA, the target trajectory function is recalculated (determined again through the recalculation) based on the lateral state amount at that time point (i.e., the lateral state amount Mkst at the steering determination time point tst). This enables the target trajectory function to be calculated/determined suitably in response to the behavior of the own vehicle which is being changed by the steering operation performed by the driver. Based on the suitably-calculated target trajectory function, the steering of the right and left steered wheels is controlled. Accordingly, the own vehicle can change lanes in accordance with the target trajectory reflecting (along with) the intention of the driver's steering operation.

Further, when the target trajectory function is recalculated, the target lane change remaining time period trest* is set based on the remaining distance Drest which is a distance required to complete the LCA. The target lane change time period tlen is modified/corrected based on the target lane change remaining time period trest*. This enables the own vehicle to change lanes in accordance with the target trajectory reflecting the intention of the driver's steering operation more effectively.

Further, in the present embodiment, when executing the LCA, the driving support ECU 10 calculates the target trajectory function y(t) based on the initial lateral position, the initial lateral speed, the initial lateral acceleration, the final target lateral position, the final target lateral speed, the final target lateral acceleration, and the target lane change time period. While the LCA is being executed, the driving support ECU 10 successively (sequentially) calculates the target lateral position y*, the target lateral speed vy*, and the target lateral acceleration ay* in accordance with the elapsed time t from the start of the LCA (for each elapsed time t). Further, the driving support ECU 10 successively (sequentially) acquires the vehicle speed v at the current time point (present time) t. The driving support ECU 10 successively (sequentially) calculates the target yaw angle θy*, the target yaw rate γ*, and the target curvature Cu* which are target values relating to the movement for changing the direction of the own vehicle, based on the acquired vehicle speed v, the target lateral speed vy*, and the target lateral acceleration ay*. The driving support ECU 10 controls the steering of right and left steered wheels based on the target lateral position y*, the target yaw angle θy*, the target yaw rate γ*, and the target curvature Cu*. Therefore, the lane change assist apparatus according to the present embodiment can have the own vehicle change lanes smoothly according to the target trajectory function. Further, since the target yaw state amount is set in response to the vehicle speed, the own vehicle can be made to change lanes in a smooth manner while reflecting the accelerator pedal operation performed by the driver (i.e., change in the vehicle speed). Further, smooth lane change can be performed in cooperation with acceleration/deceleration control by the ACC.

Further, the target lateral speed (final target lateral speed) of the own vehicle at the completion of the LCA and the target lateral acceleration (final target lateral acceleration) of the own vehicle at the completion of the LCA are both set to zero. In addition, the target lateral position (final target lateral position) of the own vehicle at the completion of the LCA is set to the center position of the target lane in the lane width direction. Therefore, after the completion of the LCA, the driving support ECU 10 can have the own vehicle travel along (according to) the lane center line CL of the target lane with the LTA. Accordingly, the steering assist control can be smoothly switched from the LCA to the LTA.

Modified Example 1 for Recalculation of Target Trajectory Function

Figure 10:
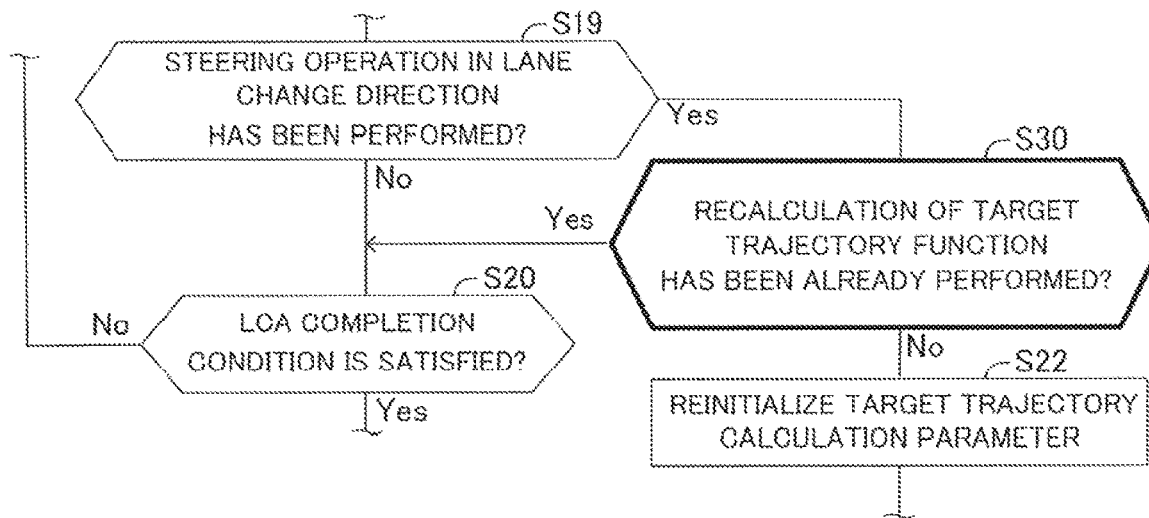
FIG. 10 is a flowchart for illustrating a steering assist control routine according to a modified example 1.

In the above-described steering assist control routine (FIG. 5), the target trajectory function is recalculated (steps S22 and S23) every time it is determined that the driver has performed the steering operation. If the target trajectory function is frequently recalculated, the behavior of the own vehicle may be unstable. In addition, the steering torque sensor may detect the steering torque even in a situation where the steering operation by the driver has not been performed, due to a disturbance torque input from the road surface, etc. In order to solve the above problem, in this modified example 1, once the target trajectory function is recalculated (steps S22 and S23), the target trajectory function is not recalculated thereafter. For example, as illustrated in FIG. 10, in the steering assist control routine (FIG. 5) of the embodiment, the process of step S30 is preferably added between step S19 and step S22. FIG. 10 illustrates mainly a modified portion in the steering assist control routine according to the modified example 1.

When the driving support ECU 10 determines that the driver has performed the steering operation (S19:Yes), the driving support ECU 10 proceeds the process to step S30. At step S30, the driving support ECU 10 determines that recalculation of the target trajectory function (S23) has been already performed after the start of the LCA. When recalculation of the target trajectory function (S23) has never been performed, the driving support ECU 10 makes a "No" determination at step S30, and then, proceeds the process to step S22. On the other hand, when recalculation of the target trajectory function (S23) has been already performed, the driving support ECU 10 makes a "Yes" determination at step S30, and then, proceeds the process to step S20.

According to the steering assist control routine in this modified example 1, the number of times of recalculation of the target trajectory function is limited to once. Therefore, the own vehicle can be made to change lanes more stably.

Modified Example 2 for Recalculation of Target Trajectory Function

When the driver has performed the steering operation during the execution of the LCA, if the actual lateral position of the own vehicle does not greatly deviate from the target lateral position in the lane change direction, the target trajectory function calculated at the start of the LCA may be used as it is (it may be continued being used). Thus, in this modified example 2, only when a deviation between the actual lateral position of the own vehicle and the target lateral position calculated from the target trajectory function is equal to or higher than a predetermined threshold and the actual lateral position is positioned at a position deviated/shifted in the lane change direction with respect to the target lateral position, the driving support ECU 10 executes recalculation of the target trajectory function (steps S22 and S23).

Figure 11:
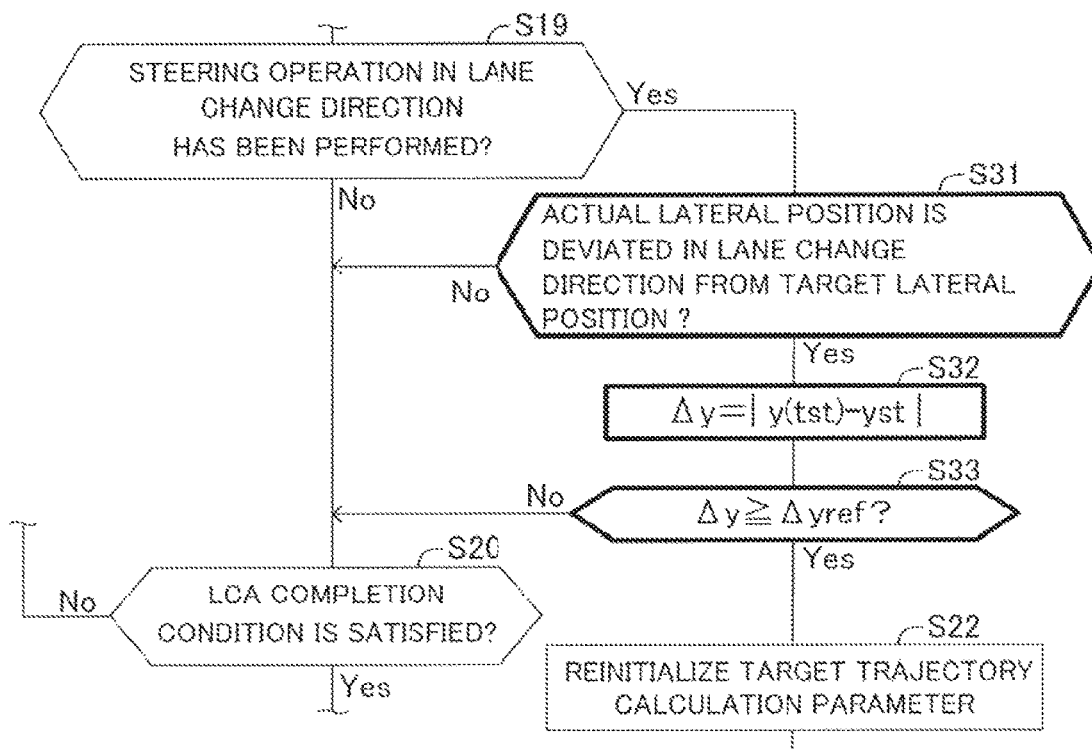
FIG. 11 is a flowchart for illustrating a steering assist control routine according to a modified example 2.

For example, as illustrated in FIG. 11, in the steering assist control routine (FIG. 5) of the embodiment, steps S31 to S33 are preferably added between step S19 and step S22. FIG. 11 illustrates mainly a modified portion in the steering assist control routine according to the modified example 2.

When the driving support ECU 10 determines that the driver has performed the steering operation (S19: Yes), the driving support ECU 10 proceeds the process to step S31. At step S31, the driving support ECU 10 determines whether or not the actual lateral position at the current time point is positioned at a position deviated/shifted in the lane change direction with respect to the target lateral position (i.e., whether or not the actual lateral position at the current time point is positioned in the lane change direction side of the target lateral position). The actual lateral position is the lateral position yst at the steering determination time point tst, and the target lateral position is the value y(tst) obtained by substituting the steering determination time point tst into the target trajectory function y(t). When the actual lateral position at the current time point is not deviated/shifted with respect to the target lateral position (S31: No), the driving support ECU 10 proceeds the process to step S20. On the other hand, when the actual lateral position at the current time point is positioned at a position deviated/shifted in the lane change direction with respect to the target lateral position (S31: Yes), the driving support ECU 10 proceeds the process to step S32. At step 32, the driving support ECU 10 calculates a deviation $\Delta y$ (=|y(tst)−yst|) between the target lateral position y(tst) and the actual lateral position yst. Next, at step S33, the driving support ECU 10 determines whether or not the deviation $\Delta y$ is equal to or larger than a predetermined threshold $\Delta yref$. This threshold $\Delta yref$ is a threshold for determining whether or not it is necessary to recalculate the target trajectory function.

When the deviation $\Delta y$ is smaller than the threshold $\Delta yref$ (S33: No), because it is not necessary to recalculate the target trajectory function, the driving support ECU 10 proceeds the process to step S20. On the other hand, when the deviation $\Delta y$ is equal to or higher than the threshold $\Delta yref$ (S33: Yes), the driving support ECU 10 proceeds the process to step S22.

According to the steering assist control routine of the modified example 2, the target trajectory function is not calculated more than necessary. Therefore, the apparatus according to the modified example 2 can have the own vehicle change lanes more stably. In addition, the calculation load of the microcomputer of the driving support ECU 10 can be reduced.

The processes of the modified example 2 may be incorporated into the routine in the modified example 1. In this configuration, steps S31 to S33 are added between step S30 and step S22 in the routine of FIG. 10.

Modified Calculation Example of Target Lane Change Remaining Time Period

In the above-described embodiment, the target lane change remaining time period trest* is calculated by multiplying the remaining distance Drest by the target time constant A in accordance with Expression (16). In this modified example, the driving support ECU 10 modifies/corrects the target lane change remaining time period trest* by using the actual lateral speed vyst at the steering determination time point tst. For example, the remaining distance Drest is corrected so as to be made shorter by using the actual lateral speed vyst in accordance with Expression (18). This enables the target lane change remaining time trest* to be adjusted so that the time trest* becomes shorter.

$$Drest1 = Drest - \alpha \times vyst \tag{18}$$

Drest1 is a modified remaining distance. Further, $\alpha$ is a predetermined reduction coefficient and is set to a small positive value. The actual lateral speed vyst is defined to have a positive value when the actual lateral speed vyst is speed in the same direction as the lane change direction. The remaining distance Drest of Expression (16) is replaced with the modified remaining distance Drest1 (Drest←Drest1). Consequently, the target lane change remaining time trest* is corrected to become shorter, as the actual lateral speed vyst in the lane change direction at the steering determination time point is higher.

Further, the target lane change remaining time trest* may be limited with a predetermined lower limit guard value so that the target lane change remaining time trest* does not become shorter than the predetermined lower limit value.

Further, the target lane change remaining time trest* may be corrected by using the actual lateral acceleration ayst at the steering determination time point tst. In this configuration, the modified remaining distance Drest1 may be calculated in accordance with Expression (19).

$$Drest1 = Drest - \beta \times ayst \tag{19}$$

$\beta$ is a predetermined reduction coefficient and is set to a small positive value. The actual lateral acceleration ayst is defined to have a positive value when the actual lateral acceleration ayst is acceleration in the same direction as the lane change direction.

Further, the target lane change remaining time trest* may be corrected by using both the actual lateral speed vyst at the steering determination time point tst and the actual lateral acceleration ayst at the steering determination time point tst. In this configuration, the modified remaining distance Drest1 may be calculated in accordance with Expression (20).

$$Drest1=Drest-(\alpha \times vyst+\beta \times ayst) \qquad (20)$$

According to the above-mentioned examples, as "the actual lateral speed vyst and/or the actual lateral acceleration ayst" in the lane change direction at the steering determination time point is larger, the target lane change remaining time trest* is corrected/modified so as to be shorter. Therefore, the target trajectory function can be calculated/determined in a more suitable manner. Accordingly, the own vehicle can be made to change lanes in accordance with the target trajectory reflecting the intention of the driver's steering operation more effectively.

In the above, the lane change assist apparatus according to the embodiment has been described, but the present invention is not limited to the above-mentioned embodiment, and various changes are possible within the range not departing from the object of the present invention.

For example, in the above-described embodiment, the determination is made as to whether or not the driver has performed the steering operation only when the steering operation is an operation which has the own vehicle move in the lane changing direction. However, there is no necessity to do so, and the presence or absence of the steering operation performed by the driver may be determined regardless of the operation direction of the steering wheel. For example, during the LCA, the driver may find an obstacle present on the road surface and perform the steering wheel in the opposite direction to the lane change direction so as to avoid the obstacle. Even in such a case, recalculation of the target trajectory function may be effectively performed.

Further, in the above-described embodiment, the target lane change time period tlen is changed in accordance with the remaining distance Drest. However, there is no necessity to do so. A configuration may be adopted in which the target lane change time period tlen is not changed (or kept unchanged) during the LCA.

In the above-described embodiment, the target trajectory calculation parameters P11, P12 and P13 set at the steering determination time point tst are actual detected values. Alternatively, those parameters may be calculated in consideration of the target lateral state amount calculated at the steering determination time point tst, that is, at least one of the target lateral position, the target lateral speed, and the target lateral acceleration. For example, the lateral position yst at the steering determination time point tst may be set/determined based on both "the target lateral position and the actual lateral position" at the steering determination time point tst, such as by obtaining a weighted average value between "the target lateral position and the actual lateral position" at the steering determination time point tst, using a predetermined weighting ratio. Similarly, the lateral speed vyst at the steering determination time point tst may be set/determined based on both "the target lateral speed and the actual lateral speed" at the steering determination time point tst, such as by obtaining a weighted average value between "the target lateral speed and the actual lateral speed" at the steering determination time point tst, using a predetermined weighting ratio. Furthermore, the lateral acceleration ayst at the steering determination time point tst may be set/determined based on both "the target lateral acceleration and the actual lateral acceleration" at the steering determination time point tst, such as by obtaining a weighted average value between "the target lateral acceleration and the actual lateral acceleration" at the steering determination time point tst, using a predetermined weighting ratio.

In the above-described embodiment, a fifth-order function is used as the target trajectory function. However, it is not always necessary to use a fifth-order function. In the above-described embodiment, the target lateral speed and the target lateral acceleration are calculated to be used as the target lateral movement state amount. However, only the target lateral speed or only the target lateral acceleration may be calculated to be used as the target lateral movement state amount. In the above-described embodiment, the target yaw angle, the target yaw rate, and the target curvature are calculated to be used as the target yaw state amount. However, at least one of them may be calculated to be used as the target yaw state amount.

For example, in the above embodiment, it is a prerequisite for carrying out the LCA that the steering assist control state is in the LTA ON-state (that is, the LTA is being executed). In other words, the LCA does not start to be executed unless the steering assist control state is in the LTA ON-state. However, such a prerequisite is not necessarily required to start the LCA. Further, as a prerequisite for carrying out the LCA, there is no need to assume that the ACC is being executed. In other words, the LCA may be able to be started even if the steering assist control state is not in the LTA ON-state. In the above embodiment, the LCA start condition includes the following condition: the road on which the own vehicle is traveling is a road for exclusive use of automobiles. However, the LCA start condition does not necessarily include such a condition.

What is claimed is:

1. A vehicle control apparatus comprising:
   a camera configured to capture an image in front of a vehicle;
   a steering motor configured to vary a steering angle of said vehicle; and
   a control unit, comprising at least one processor and memory storing computer instructions, said computer instructions configured to cause, when executed by said at least one processor, said control unit to:
   obtain a relative positional relationship between said vehicle and a lane in which said vehicle is traveling, based on said image captured by said camera;
   obtain, based on said obtained relative positional relationship, a first target trajectory, for letting said vehicle move from an initial lateral position in an original lane to a final target lateral position in an adjacent lane;
   cause, based on said obtained relative positional relationship, said vehicle to travel along said first target trajectory, using said steering motor;
   obtain, based on said obtained relative positional relationship, a second target trajectory, upon a steering determination time point when it is determined that a driver has performed a steering operation while said vehicle is being caused to travel along said first target trajectory, for letting said vehicle move from a lateral position of said vehicle at said steering determination time point to said final target lateral position; and
   cause, based on said obtained relative positional relationship, said vehicle to travel along said second target trajectory in place of said first target trajectory, using said steering motor, after said steering determination time point.

2. The vehicle control apparatus according to claim 1, wherein, said computer instructions are configured to cause, when executed by said at least one processor, the control unit to:
obtain said first target trajectory in such a manner that said vehicle moves from said initial lateral position to said final target lateral position in a target time period; and
obtain said second target trajectory in such a manner that said vehicle moves from said lateral position of said vehicle at said steering determination time point to said final target lateral position in a target lane change remaining time period.

3. The vehicle control apparatus according to claim 2, wherein,
said computer instructions are configured to cause, when executed by said at least one processor, the control unit to:
obtain a time length of said target time period based on a distance in a lane width direction between said initial lateral position and said final target lateral position; and
obtain a time length of said target lane change remaining time period based on a distance in said lane width direction between said lateral position of said vehicle at said steering determination time point and said final target lateral position.

4. The vehicle control apparatus according to claim 3, wherein,
said computer instructions are configured to cause, when executed by said at least one processor, the control unit to:
obtain said time length of said target lane change remaining time period in such a manner that said time length of said target lane change remaining time period is shorter as a lateral speed in said lane width direction of said vehicle at said steering determination time point is higher.

5. The vehicle control apparatus according to claim 3, wherein,
said computer instructions are configured to cause, when executed by said at least one processor, the control unit to:
obtain said time length of said target lane change remaining time period in such a manner that said time length of said target lane change remaining time period is shorter as a lateral acceleration in said lane width direction of said vehicle at the steering determination time point is higher.

6. A vehicle control method comprising:
capturing an image in front of a vehicle by a camera;
varying a steering angle of said vehicle by a steering motor; and
obtaining a relative positional relationship between said vehicle and a lane in which said vehicle is traveling, based on said image captured by said camera;
obtaining, based on said obtained relative positional relationship, a first target trajectory, for letting said vehicle move from an initial lateral position in an original lane to a final target lateral position in an adjacent lane;
causing, based on said obtained relative positional relationship, said vehicle to travel along said first target trajectory, using said steering motor;
obtaining, based on said obtained relative positional relationship, a second target trajectory, upon a steering determination time point when it is determined that a driver has performed a steering operation while said vehicle is being caused to travel along said first target trajectory, for letting said vehicle move from a lateral position of said vehicle at said steering determination time point to said final target lateral position; and
causing, based on said obtained relative positional relationship, said vehicle to travel along said second target trajectory in place of said first target trajectory, using said steering motor, after said steering determination time point.

7. The vehicle control method according to claim 6, further comprising:
obtaining said first target trajectory in such a manner that said vehicle moves from said initial lateral position to said final target lateral position in a target time period; and
obtaining said second target trajectory in such a manner that said vehicle moves from said lateral position of said vehicle at said steering determination time point to said final target lateral position in a target lane change remaining time period.

8. The vehicle control method according to claim 7, further comprising:
obtaining a time length of said target time period based on a distance in a lane width direction between said initial lateral position and said final target lateral position; and
obtaining a time length of said target lane change remaining time period based on a distance in said lane width direction between said lateral position of said vehicle at said steering determination time point and said final target lateral position.

9. The vehicle control method according to claim 8, further comprising:
obtaining said time length of said target lane change remaining time period in such a manner that said time length of said target lane change remaining time period is shorter as a lateral speed in said lane width direction of said vehicle at said steering determination time point is higher.

10. The vehicle control method according to claim 8, further comprising:
obtaining said time length of said target lane change remaining time period in such a manner that said time length of said target lane change remaining time period is shorter as a lateral acceleration in said lane width direction of said vehicle at the steering determination time point is higher.

11. A non-transitory computer readable medium storing instructions that, when executed by at least one processor for a control device to perform a vehicle control, cause the at least one processor to:
capture an image in front of a vehicle by a camera;
vary a steering angle of said vehicle by a steering motor; and
obtain a relative positional relationship between said vehicle and a lane in which said vehicle is traveling, based on said image captured by said camera;
obtain, based on said obtained relative positional relationship, a first target trajectory, for letting said vehicle move from an initial lateral position in an original lane to a final target lateral position in an adjacent lane;
cause, based on said obtained relative positional relationship, said vehicle to travel along said first target trajectory, using said steering motor;
obtain, based on said obtained relative positional relationship, a second target trajectory, upon a steering determination time point when it is determined that a driver has performed a steering operation while said vehicle is being caused to travel along said first target trajectory, for letting said vehicle move from a lateral position of said vehicle at said steering determination time point to said final target lateral position; and cause, based on said obtained relative positional relationship, said vehicle to travel along said second target trajectory in place of said first target trajectory, using said steering motor, after said steering determination time point.

12. The non-transitory computer-readable medium according to claim 11, wherein the program is further configured to cause the processor to:

obtain said first target trajectory in such a manner that said vehicle moves from said initial lateral position to said final target lateral position in a target time period; and obtain said second target trajectory in such a manner that said vehicle moves from said lateral position of said vehicle at said steering determination time point to said final target lateral position in a target lane change remaining time period.

13. The non-transitory computer-readable medium according to claim 12, wherein the program is further configured to cause the processor to:

obtain a time length of said target time period based on a distance in a lane width direction between said initial lateral position and said final target lateral position; and obtain a time length of said target lane change remaining time period based on a distance in said lane width direction between said lateral position of said vehicle at said steering determination time point and said final target lateral position.

14. The non-transitory computer-readable medium according to claim 13, wherein the program is further configured to cause the processor to:

obtain said time length of said target lane change remaining time period in such a manner that said time length of said target lane change remaining time period is shorter as a lateral speed in said lane width direction of said vehicle at said steering determination time point is higher.

15. The non-transitory computer-readable medium according to claim 13, wherein the program is further configured to cause the processor to:

obtain said time length of said target lane change remaining time period in such a manner that said time length of said target lane change remaining time period is shorter as a lateral acceleration in said lane width direction of said vehicle at the steering determination time point is higher.

\* \* \* \* \*